(12) United States Patent
Okumura

(10) Patent No.: US 12,542,674 B2
(45) Date of Patent: Feb. 3, 2026

(54) AUTHENTICATION DEVICE, AUTHENTICATION METHOD, AND RECORDING MEDIUM

(71) Applicant: NEC Platforms, Ltd., Kawasaki (JP)

(72) Inventor: Fujio Okumura, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 296 days.

(21) Appl. No.: 18/025,151

(22) PCT Filed: Aug. 19, 2021

(86) PCT No.: PCT/JP2021/030279
§ 371 (c)(1),
(2) Date: Mar. 7, 2023

(87) PCT Pub. No.: WO2022/054519
PCT Pub. Date: Mar. 17, 2022

(65) Prior Publication Data
US 2024/0333491 A1 Oct. 3, 2024

(30) Foreign Application Priority Data
Sep. 14, 2020 (JP) .................................. 2020-153425

(51) Int. Cl.
*H04L 9/32* (2006.01)
*G06F 21/31* (2013.01)
(Continued)

(52) U.S. Cl.
CPC ............ *H04L 9/3226* (2013.01); *G06F 21/31* (2013.01); *G09C 1/02* (2013.01); *H04L 9/0869* (2013.01);
(Continued)

(58) Field of Classification Search
CPC ............ G06F 21/31; G06F 21/62; G09C 1/02; H04L 9/08; H04L 9/0869; H04L 9/0861;
(Continued)

(56) References Cited

U.S. PATENT DOCUMENTS 7,036,016 B1 * 4/2006 Smith, Jr. ................ G09C 1/00
380/54
8,140,854 B2 * 3/2012 Ogawa ..................... G06F 21/36
726/28
(Continued)

FOREIGN PATENT DOCUMENTS

JP 2001-005785 A 1/2001
JP 2005-196800 A 7/2005
(Continued)

OTHER PUBLICATIONS

International Search Report for PCT Application No. PCT/JP2021/030279, mailed on Oct. 19, 2021.
(Continued)

*Primary Examiner* — Shaqueal D Wade-Wright

(57) ABSTRACT

An authentication device comprising: a storage unit for storing shared information including password and shared rule that are preset for each user; a random number sequence generation unit for generating a random number sequence pattern; a calculation unit for generating a key code based on the shared rules, using provisional numerals selected from the random number sequence pattern and secret numerals constituting passwords; a transceiver for receiving identification information of a user to be authenticated from an input terminal, transmitting the random number sequence pattern in association with the identification information to the input terminal, and receiving, from the input terminal, a key code consisting of the numerals selected based on the shared rules from the random number sequence pattern by the user to be authenticated; and an authentication unit for
(Continued)

authenticating the user to be authenticated, using the key code received and the key code generated.

8 Claims, 26 Drawing Sheets

(51) Int. Cl.
  *G09C 1/02* (2006.01)
  *H04L 9/08* (2006.01)
(52) U.S. Cl.
  CPC .......... *H04L 9/0863* (2013.01); *H04L 9/3228* (2013.01); *H04L 9/3268* (2013.01)
(58) Field of Classification Search
  CPC ....... H04L 9/0863; H04L 9/32; H04L 9/3226; H04L 9/3228; H04L 9/321; H04L 9/3268; H04L 63/061; H04L 63/06; H04L 63/068; H04L 63/08; H04L 63/0838; H04L 63/0846; H04L 63/10; H04L 63/12
  See application file for complete search history.

(56) References Cited

U.S. PATENT DOCUMENTS

| | | | | |
|---|---|---|---|---|
| 2007/0226784 A1* | 9/2007 | Ueda | ............ | H04L 9/3228 726/5 |
| 2009/0013402 A1* | 1/2009 | Plesman | ............ | H04L 9/3228 726/18 |
| 2013/0263250 A1* | 10/2013 | Leckey | ............ | H04L 63/0846 726/18 |
| 2023/0216686 A1* | 7/2023 | Kojima | ............ | H04L 9/3228 713/168 |

FOREIGN PATENT DOCUMENTS

| | | |
|---|---|---|
| JP | 2006-146327 A | 6/2006 |
| JP | 2007-264839 A | 10/2007 |
| JP | 2008-276602 A | 11/2008 |

OTHER PUBLICATIONS

English translation of Written opinion for PCT Application No. PCT/JP2021/030279, mailed on Oct. 19, 2021.

* cited by examiner

Fig.6

| USER ID | PASSWORD | SHARED INFORMATION | | 131 |
|---|---|---|---|---|
| | | SHARED RULE | | |
| | | SHARED PATTERN | CALCULATION RULE | |
| AAA | 721 | [3x3 grid: 3 top-right, 2 middle, 1 bottom-right] | A1 | |
| BBB | 853 | [3x3 grid: 2,3 top; 1 bottom-left] | B1 | |
| CCC | 224 | [3x3 grid: 1,2,3 top; 2 middle] | C1 | |
| ... | ... | ... | ... | ... |

Fig.8

| USER ID | PASSWORD | SHARED INFORMATION | |
|---|---|---|---|
| | | SHARED RULE | |
| | | SHARED PATTERN | CALCULATION RULE |
| AAA | 721 | (pattern: 1,2,3) | A2 |
| BBB | 853 | (pattern: 1,2,3) | B2 |
| CCC | 224 | (pattern: 1,2,3) | C2 |
| ... | ... | ... | ... |

| USER ID | PASSWORD | SHARED INFORMATION | | 133 |
|---|---|---|---|---|
| | | SHARED RULE | | |
| | | SHARED PATTERN | CALCULATION RULE | |
| | | MONDAY / TUESDAY / WEDNESDAY | | |
| AAA | 721 | (patterns) | A2 | ... |
| ... | ... | ... | ... | ... |

Fig. 12

| USER ID | SHARED INFORMATION | | |
|---|---|---|---|
| | PASSWORD | SHARED RULE | |
| | | SHARED PATTERN | CALCULATION RULE |
| AAA | 721 | FIRST CENTER NUMERAL: 7<br>SECOND CENTER NUMERAL: 3<br>SELECTION ORDER:<br>CLOCKWISE | A2 |
| BBB | 853 | FIRST CENTER NUMERAL: 5<br>SECOND CENTER NUMERAL: 1<br>SELECTION ORDER:<br>CLOCKWISE | B2 |
| CCC | 224 | FIRST CENTER NUMERAL: 1<br>SECOND CENTER NUMERAL: 9<br>SELECTION ORDER:<br>COUNTERCLOCKWISE | C2 |
| ⋮ | ⋮ | ⋮ | ⋮ |

| USER ID | SHARED INFORMATION | | |
|---|---|---|---|
| | PASSWORD | SHARED RULE | |
| | | SHARED PATTERN | CALCULATION RULE |
| AAA | JANUARY TO MARCH: 3721<br>APRIL TO JUNE: 7213<br>JULY TO SEPTEMBER: 2137<br>OCTOBER TO DECEMBER: 1372 | 4 _ 3<br>_ 2 _<br>_ _ 1 | A2 |
| BBB | JANUARY TO MARCH: 8531<br>APRIL TO JUNE: 5318<br>JULY TO SEPTEMBER: 3185<br>OCTOBER TO DECEMBER: 1853 | _ 2 _<br>_ 4 _<br>1 _ 3 | B2 |
| CCC | JANUARY TO MARCH: 2241<br>APRIL TO JUNE: 2412<br>JULY TO SEPTEMBER: 4122<br>OCTOBER TO DECEMBER: 1224 | 4 1 _<br>_ 2 3<br>_ _ _ | C2 |
| ⋮ | ⋮ | ⋮ | ⋮ |

135

AUTHENTICATION DEVICE, AUTHENTICATION METHOD, AND RECORDING MEDIUM

This application is a National Stage Entry of PCT/JP2021/030279 filed on Aug. 19, 2021, which claims priority from Japanese Patent Application 2020-153425 filed on Sep. 14, 2020, the contents of all of which are incorporated herein by reference, in their entirety.

TECHNICAL FIELD

The present disclosure relates to an authentication device or the like that performs authentication using authentication information.

BACKGROUND ART

An input terminal for inputting authentication information such as a password and a personal identification number is installed in an authentication system such as an automatic teller machine (ATM) installed in a public place. For example, the user of the authentication system inputs the authentication information according to the numeric keypad displayed on the touch panel of the input terminal. In a general input terminal, when the user inputs authentication information to an input device, the authentication information may be peeped by a third party.

PTL 1 discloses a personal authentication method for the purpose of reliably authenticating a user himself/herself without allowing another person to easily know a personal identification number. First, in the method of PTL 1, a random numeral is generated in response to an input of a user identifier (ID) from a user to be authenticated. Next, in the method of PTL 1, a first character string calculated by a specific calculation method is acquired from a first passcode input from a user and a random numeral. Next, in the method of PTL 1, a second character string is calculated from a second passcode and a second random numeral associated with the plurality of user IDs. In the method of PTL 1, the user is authenticated by comparing the first character string with the second character string.

PTL 2 discloses an electronic authentication device intended to prevent leakage of a key to a third party in a one-time password system. First, a host computer that manages a customer transmits predetermined random number data to a terminal of the customer. The terminal of the customer generates a password based on an encryption key having a predetermined shape shared with the host computer and superimposed on an arbitrary position of predetermined random number data two-dimensionally arranged on the display. The terminal of the customer transmits the generated password to the host computer. The host computer generates a plurality of selectable data strings by superimposing an encryption key having a predetermined shape on predetermined random number data arranged two-dimensionally on a display. The host computer compares the password received from the terminal of the customer with the plurality of generated data strings, determines that the received data string is the password transmitted from the terminal of the customer when there is a match, and authenticates the customer.

CITATION LIST

Patent Literature

[PTL 1] JP 2006-146327 A
[PTL 2] JP 2001-005785 A

SUMMARY OF INVENTION

Technical Problem

In the method of PTL 1, the user inputs the first passcode to the mobile terminal unit in order for the mobile terminal calculation unit to calculate an undecodable character string. At this time, there is a possibility that a third party looks into the personal identification number input on the screen of the mobile terminal unit.

In the method of PTL 2, an input order of keys based on an encryption key having a predetermined shape is fixed. Therefore, when a third party looks into an input of a password via a terminal a plurality of times, there is a possibility that an input order of a key is leaked.

An object of the present disclosure is to provide an authentication device and the like capable of preventing leakage of authentication information such as a password.

Solution to Problem

An authentication device according to one aspect of the present disclosure includes: a storage unit configured to store shared information including a password and a shared rule, the password and the shared rule being preset for each user; a random number sequence generation unit configured to generate a random number sequence pattern including a plurality of different numerals for each authentication opportunity of a user to be authenticated; a calculation unit configured to select a plurality of provisional numerals from the random number sequence pattern based on the shared rule, and generate a key code using the plurality of selected provisional numerals and a plurality of secret numerals constituting the password; a transmission/reception unit configured to receive, in an authentication opportunity of the user to be authenticated, identification information of the user to be authenticated from an input terminal operated by the user to be authenticated, transmit the random number sequence pattern generated in the authentication opportunity of the user to be authenticated to the input terminal in association with the identification information, and receive, from the input terminal, the key code consisting of a numeral selected by the user to be authenticated from the random number sequence pattern based on the shared rule; and an authentication unit configured to authenticate the user to be authenticated based on the key code received from the input terminal and the key code generated by the calculation unit.

An authentication method according to one aspect of the present disclosure includes: storing, in a storage unit, shared information including a password and a shared rule, the password and the shared rule being preset for each user; receiving identification information of a user to be authenticated from an input terminal operated by the user to be authenticated; generating a random number sequence pattern including a plurality of different numerals in response to reception of identification information of the user to be authenticated; transmitting the generated random number sequence pattern to the input terminal in association with the identification information; selecting a plurality of provisional numerals from the random number sequence pattern based on the shared rule; generating a key code using the plurality of selected provisional numerals and a plurality of secret numerals constituting the password; receiving, from the input terminal, the key code consisting of a numeral selected by the user to be authenticated from the random number sequence pattern based on the shared rule; and authenticating the user to be authenticated based on the key code received from the input terminal and the key code generated by an own device.

A program according to an aspect of the present disclosure causes a computer to perform: storing, in a storage unit, shared information including a password and a shared rule, the password and the shared rule being preset for each user; receiving identification information of a user to be authenticated from an input terminal operated by the user to be authenticated; generating a random number sequence pattern including a plurality of different numerals in response to reception of identification information of the user to be authenticated; transmitting the generated random number sequence pattern to the input terminal in association with the identification information; selecting a plurality of provisional numerals from the random number sequence pattern based on the shared rule; generating a key code using the plurality of selected provisional numerals and a plurality of secret numerals constituting the password; receiving, from the input terminal, the key code consisting of a numeral selected by the user to be authenticated from the random number sequence pattern based on the shared rule; and authenticating the user to be authenticated based on the key code received from the input terminal and the key code generated by an own device.

Advantageous Effects of Invention

According to the present disclosure, it is possible to provide an authentication device and the like capable of preventing leakage of authentication information such as a password.

BRIEF DESCRIPTION OF DRAWINGS

FIG. 6 is an example of a shared information table stored in the storage unit of the authentication device of the authentication system of the first example embodiment.

FIG. 8 is an example of a shared information table stored in the storage unit of the authentication device of the authentication system of the first example embodiment.

FIG. 10 is an example of a shared information table stored in the storage unit of the authentication device of the authentication system of the first example embodiment.

FIG. 12 is an example of a shared information table stored in the storage unit of the authentication device of the authentication system of the first example embodiment.

FIG. 14 is an example of a shared information table stored in the storage unit of the authentication device of the authentication system of the first example embodiment.

EXAMPLE EMBODIMENT

Figure 1:
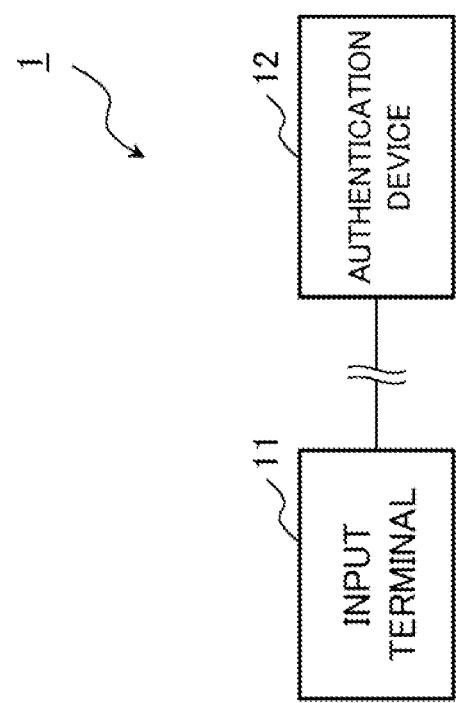
FIG. 1 is a block diagram illustrating an example of a configuration of an authentication system of a first example embodiment.

Hereinafter, embodiments of the present disclosure will be described with reference to the drawings. However, the example embodiments described below may be technically limited for carrying out the present disclosure, but the scope of the disclosure is not limited to the following. In all the drawings used in the following description of the example embodiment, the same reference numerals are given to the same parts unless there is a particular reason. In the following example embodiments, repeated description of similar configurations and operations may be omitted.

First Example Embodiment

Next, an authentication system according to a first example embodiment will be described with reference to the drawings. The authentication system of the present example embodiment authenticates an authentication target person based on authentication information input by the authentication target person (also referred to as a user to be authenticated). For example, the authentication system of the present example embodiment is applied to authentication using authentication information such as a password (also referred to as a passcode or a passphrase) or a personal identification number used for authentication of an automatic teller machine (ATM) or the like. Hereinafter, an example in which a password including a plurality of numerals is used as the authentication information will be described. The method of the present example embodiment can be used for any authentication as long as it is authentication using numerals.

(Configuration)

FIG. 1 is a block diagram illustrating an example of a configuration of an authentication system 1 according to the present example embodiment. The authentication system 1 includes an input terminal 11 and an authentication device 12. The input terminal 11 and the authentication device 12 are communicably connected via a network such as the Internet. For example, the input terminal 11 is provided as a dedicated terminal such as an ATM. Furthermore, the input terminal 11 may be provided as application software (hereinafter, the application is also referred to as an application) installed in a mobile terminal such as a personal computer or a smartphone. The authentication device 12 is constructed in a server or a cloud. The authentication device 12 may be hardware or software.

Hereinafter, in order to uniquely identify the user, an authentication card (not illustrated) such as a magnetic card or an integrated circuit (IC) card in which identifier (ID) information (also referred to as identification information) of the user is recorded is used. In a case where authentication via the web is performed, the user's ID information may be input on the web. The input terminal 11 detects the insertion of the authentication card into the input terminal 11 or the input of the ID information on the web as the start of the authentication operation. However, the user may be uniquely specified by other than the identification information registered in the authentication card or the ID information (identification information) input on the web. For example, the user may be uniquely identified by biometric authentication such as face authentication, fingerprint authentication, palm print authentication, or gait authentication. For example, the user may be uniquely specified based on a numerical sequence, a character string, or a symbol string selected from numerals, characters, symbols, or the like displayed in an initial state on a user interface (UI) of the input terminal 11. The method for uniquely specifying the user is not particularly limited.

When detecting the start of the authentication operation by the user, the input terminal 11 transmits the ID information of the user to the authentication device 12. When receiving the ID information of the user, the authentication device 12 generates a random number sequence pattern in association with the ID information. The authentication device 12 is configured by 9 integers selected from 10 integers of 0 to 9, and generates a random number sequence pattern arranged in a matrix of 3 rows×3 columns. The input terminal 11 transmits the generated random number sequence pattern to the input terminal 11 that is the transmission source of the ID information. The input terminal 11 displays the received random number sequence pattern on the UI. In the present example embodiment, the input terminal 11 causes a UI including a random number sequence pattern arranged in a matrix of 3 rows×3 columns to display.

The authentication device 12 stores shared information shared between the user and the authentication device 12. The shared information includes a password and a shared rule set for each user. The password is authentication information preset by the user. In the present example embodiment, an example of using a password consisting of a three-digit numeral will be described. The shared rule is a rule shared between the user and the authentication device 12. The user calculates a key code according to the preset shared rule by using the numeral included in the random number sequence pattern displayed on the UI of the input terminal 11. The key code is a numeric string input as authentication information by the user in the random number sequence pattern displayed on the UI of the input terminal 11. The key code is valid only in one authentication opportunity, and the arrangement of the numerals also changes each time, so that the authentication information of the user is not leaked even if the information is leaked. Similarly to the user, the authentication device 12 calculates the key code according to the preset shared rule using the random number sequence pattern. When the key code calculated by the user and the key code calculated by the authentication device 12 match, the authentication device 12 authenticates the user.

The shared rule includes a shared pattern and a calculation rule set for each user. The shared pattern is a pattern indicating an order of selecting a plurality of numerals included in the random number sequence pattern displayed on the UI of the input terminal 11. The calculation rule is a rule related to calculation that can be performed on each numeral selected from a plurality of numerals included in the random number sequence pattern based on the shared pattern.

Figure 2:
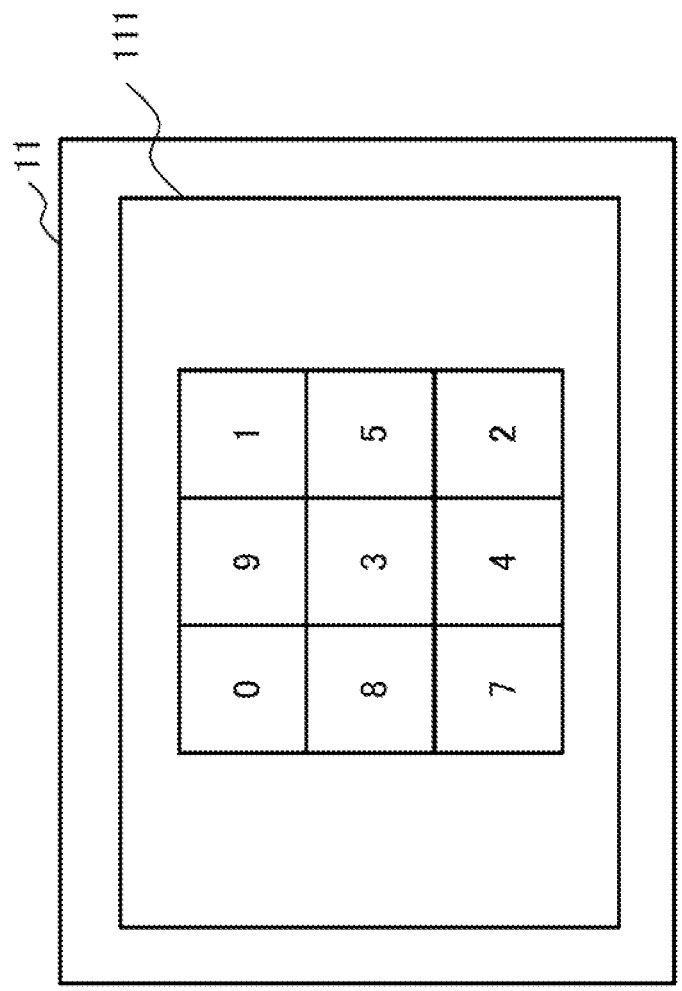
FIG. 2 is a conceptual diagram illustrating an example of a random number sequence pattern displayed on a user interface of an input terminal of the authentication system of the first example embodiment.

FIG. 2 is a conceptual diagram illustrating an example of a random number sequence pattern displayed on a UI 111 of the input terminal 11. FIG. 2 is an example of a random number sequence pattern in which different 9 integers (0, 1, 2, 3, 4, 5, 7, 8, 9) selected from 10 integers of 0 to 9 are arranged in a matrix of 3 rows×3 columns. In the present example embodiment, an example in which a single-digit numeral is arranged in each cell of the random number sequence pattern is illustrated, but the number of digits of numerals displayed in each cell of the random number sequence pattern is not limited to one digit.

Figure 3:
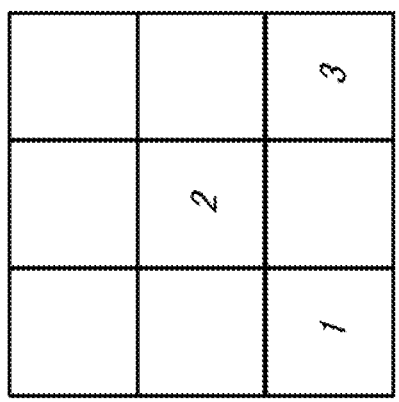
FIG. 3 is a conceptual diagram illustrating an example of a shared pattern stored in a storage unit of an authentication device of the authentication system of the first example embodiment.

FIG. 3 is a conceptual diagram illustrating an example of a shared pattern. The shared pattern indicates an order of selecting a numeral from the random number sequence pattern. Individual numerals selected from the random number sequence pattern are referred to as provisional numerals. The provisional numerals are written as a first provisional numeral, a second provisional numeral, . . . , and an m-th provisional numeral (m is a natural number) according to the order of selection. The shared pattern in FIG. 3 indicates that, in a random number sequence pattern arranged in a matrix of 3 rows×3 columns, the first provisional numeral is selected from the first column in the third row, the second provisional numeral is selected from the second column in the second row, and the third provisional numeral is selected from the third column in the third row. Associated to FIG. 2, the first provisional numeral is "7", the second provisional numeral is "3", and the third provisional numeral is "2".

For example, a password of a certain user is "721". Regarding the password, a first secret numeral, a second secret numeral, and a third secret numeral are written in order from the left of the three-digit number. That is, if the numeral of the password is n digits, the first secret numeral, the second secret numeral, . . . , and the n-th secret numeral are written in order from the left of the numeral (n is a natural number). When the numeral of the key code is n digits, the key code is written as a first key numeral, a second key numeral, . . . , and an n-th key numeral in order from the left of the number.

For example, the calculation rule is to add the first provisional numeral to the first secret numeral, add the second provisional numeral to the second secret numeral, add the third provisional numeral to the third secret numeral, and arrange the numerals of the last digits of these numerical values in order. In this case, the first key numeral of the key code is "4" which is the first numeral of "14" which is a numerical value obtained by adding "7" which is the first secret numeral and "7" which is the first provisional numeral. The second key numeral of the key code is "5" which is the first numeral of "5" which is a numerical value obtained by adding "2" which is the second secret numeral and "3" which is the second provisional numeral. The third key numeral of the key code is "3" which is the first numeral of "3" which is a numerical value obtained by adding "1" which is the third secret numeral and "2" which is the third provisional numeral. That is, the key code is "453". The user and the authentication device 12 calculate a key code by performing a calculation using a predetermined password and a random number sequence pattern generated at the start of authentication based on the above-described shared rule for each authentication opportunity.

The input terminal 11 transmits the key code input by the user to the authentication device 12. The authentication device 12 compares the key code calculated by the user with the key code calculated by the authentication device 12. When the key code calculated by the user and the key code calculated by the authentication device 12 match, the authentication device 12 authenticates the user. On the other hand, when the key code calculated by the user does not match the key code calculated by the authentication device 12, the authentication device 12 does not authenticate the user.

The key code input to the UI of the input terminal 11 by the user in the above procedure is a numeric string that cannot be predicted because it is different every time. Since the numeral of the key code displayed on the UI of the input terminal 11 is displayed at an undefined position every time, the display position cannot be predicted. That is, according to the method of the present example embodiment, since the password and the shared information of the user cannot be specified, even if the input of the key code by the user is stolen, the password and the shared information are not leaked. That is, according to the authentication method of the present example embodiment, the authentication system with a high security level can be constructed.

Next, detailed configurations of the input terminal 11 and the authentication device 12 constituting the authentication system 1 will be described with reference to the drawings.

Hereinafter, the input terminal 11 and the authentication device 12 will be described using functional blocks. Actually, the input terminal 11 and the authentication device 12 are implemented by cooperative processing with a storage unit that stores a program, an information processing device including a processor that executes the program stored in the storage unit, and the like.

[Input Terminal]

Figure 4:
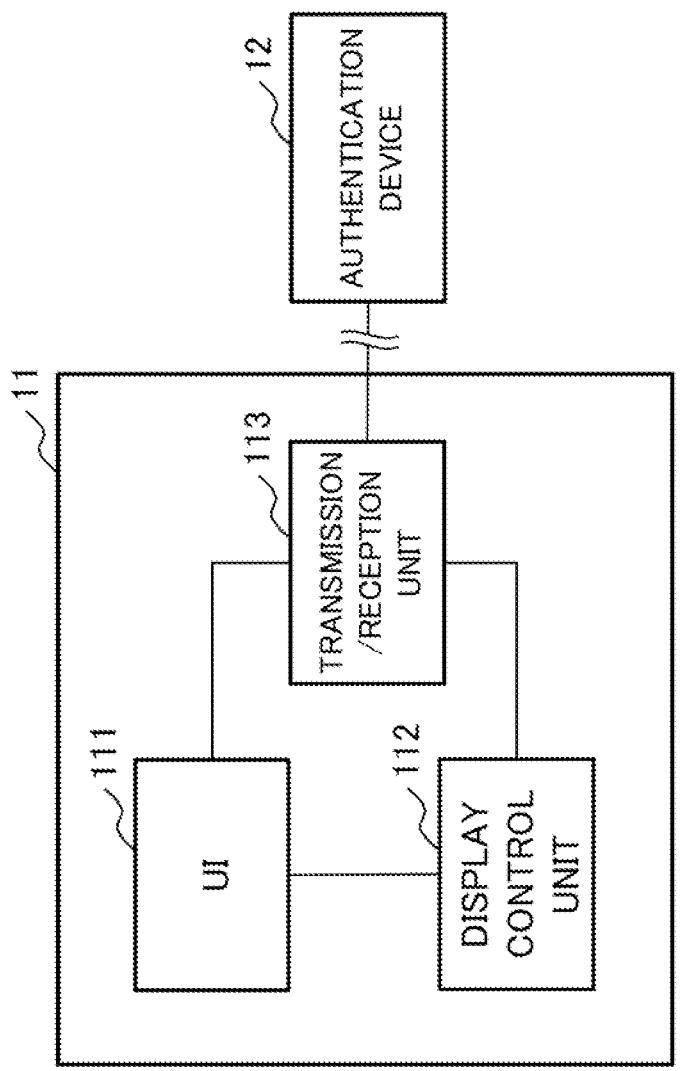
FIG. 4 is a block diagram illustrating an example of a configuration of the input terminal of the authentication system of the first example embodiment.

FIG. 4 is a block diagram illustrating an example of a configuration of the input terminal 11. The input terminal 11 includes a UI 111, a display control unit 112, and a transmission/reception unit 113. FIG. 4 also illustrates the authentication device 12 connected to the input terminal 11.

The UI 111 is an interface that displays display information such as an operation screen and accepts an operation on the operation screen. For example, the UI 111 is implemented by a touch panel or the like having both a display function and an input function. For example, the UI 111 is used to input authentication information such as a password. The UI 111 is provided as a graphical user interface, a touch interface, or the like. In a case where the input terminal 11 is implemented as an ATM, for example, the UI 111 is provided as a touch interface. For example, in a case where authentication information is input via the web, the UI 111 may be provided as a web user interface.

The display control unit 112 displays display information such as an operation screen on the UI 111. The display control unit 112 switches display information to be displayed on the UI 111 according to a preset program. For example, display information to be displayed on the UI 111 and a program for switching the display information are stored in a storage unit (not illustrated).

When detecting the start of the authentication operation by the user, the transmission/reception unit 113 transmits the ID information of the user to the authentication device 12. For example, when the card of the user is inserted into the input terminal 11, the transmission/reception unit 113 detects the start of the authentication operation by the user, and transmits the ID information recorded in the card to the authentication device 12. For example, when the ID information is input via the UI 111, the transmission/reception unit 113 detects the start of the authentication operation by the user, and transmits the input ID information to the authentication device 12. The transmission/reception unit 113 receives the random number sequence pattern transmitted from the authentication device with the reception of the ID information as a trigger from the authentication device 12. The transmission/reception unit 113 transmits the authentication information input via the UI 111 to the authentication device 12. The transmission/reception unit 113 receives the authentication result from the authentication device 12.

[Face Authentication Device]

Figure 5:
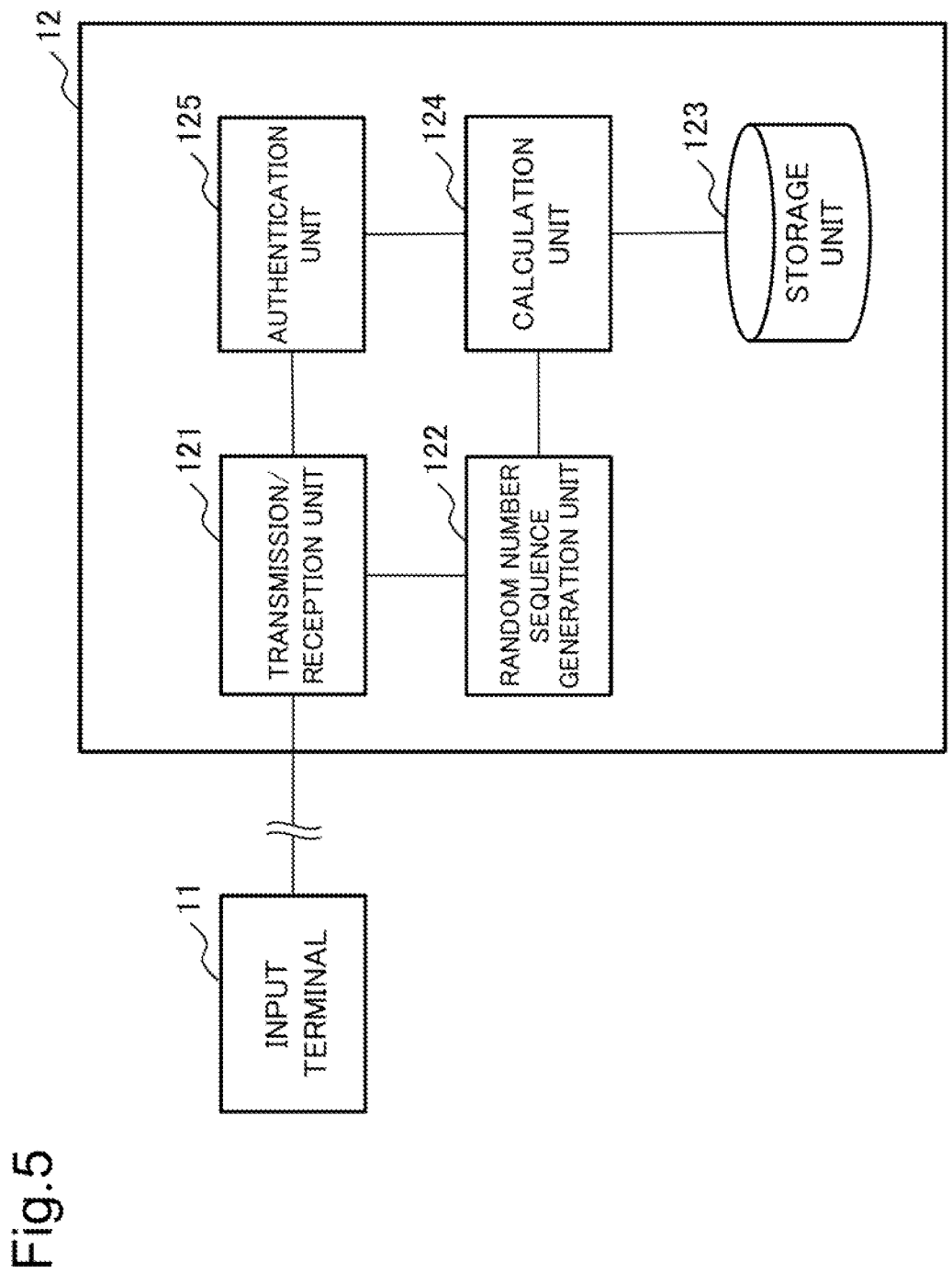
FIG. 5 is a block diagram illustrating an example of a configuration of the authentication device of the authentication system of the first example embodiment.

FIG. 5 is a block diagram illustrating an example of a configuration of the authentication device 12. The authentication device 12 includes a transmission/reception unit 121, a random number sequence generation unit 122, a storage unit 123, a calculation unit 124, and an authentication unit 125. FIG. 5 also illustrates the input terminal 11 connected to the authentication device 12.

The transmission/reception unit 121 receives the user ID from the input terminal 11. When receiving the user ID from the input terminal 11, the transmission/reception unit 121 transmits the random number sequence pattern generated by the random number sequence generation unit 122 to the input terminal 11 in association with the user ID. The transmission/reception unit 121 receives the key code input by the user from the input terminal 11. The received key code for each user is authenticated by the authentication unit 125. The transmission/reception unit 121 transmits the authentication result by the authentication unit 125 to the input terminal 11. The transmission/reception unit 121 may transmit/receive data other than the user ID, the random number sequence pattern, the key code, and the authentication result to/from the input terminal 11.

The random number sequence generation unit 122 generates a random number sequence pattern each time the transmission/reception unit 121 receives the user ID. For example, the random number sequence generation unit 122 randomly selects 9 different numerals from 10 integers of 0 to 9, and generates a random number sequence pattern in which the selected 9 numerals are arranged in a matrix of 3 rows×3 columns. The number and arrangement of the numerals selected by the random number sequence generation unit 122 are not limited to the examples described herein.

The storage unit 123 stores shared information for each user. The shared information includes a password and a shared rule set for each user. The password is authentication information preset by the user. For example, the password is a three-digit or four-digit numeric string. The shared rule is a rule shared between the user and the authentication device 12. The shared rule includes a shared pattern and a calculation rule set for each user. The shared pattern is a pattern indicating an order of selecting a plurality of numerals included in the random number sequence pattern displayed on the UI of the input terminal 11. The calculation rule is a rule related to calculation performed on each numeral sequentially selected from a plurality of numerals included in the random number sequence pattern based on the shared pattern. For example, the calculation rule is to add the first provisional numeral to the first secret numeral, add the second provisional numeral to the second secret numeral, add the third provisional numeral to the third secret numeral, and select the last digit of those numerical values. The calculation rule cannot be specified because different rules are set for each user.

The calculation unit 124 selects a numeral from a plurality of numerals included in the random number sequence pattern based on the shared pattern associated with the user being authenticated, and executes a predetermined calculation on each selected number to generate a key code. The key code is a numeric string input as authentication information by the user in the random number sequence pattern displayed on the UI of the input terminal 11.

For example, the calculation unit 124 adds any secret numeral included in the password to the provisional numeral selected based on the shared pattern, and executes a calculation of selecting the numeral of the last digit of the numerical value of the calculation result as a predetermined calculation. For example, the calculation unit 124 may execute, as a predetermined calculation, a calculation of subtracting any secret numeral included in the password from the provisional numeral selected based on the shared pattern and selecting the numeral of the last digit of the absolute value of the numerical value of the calculation result. For example, the calculation unit 124 executes, as a predetermined calculation, a calculation of multiplying the provisional numeral selected based on the shared pattern by any secret numeral included in the password and selecting the numeral of the last digit of the numerical value of the calculation result. For example, the calculation unit 124 executes, as a predetermined calculation, a calculation of dividing any secret numeral included in the password by the provisional numeral selected based on the shared pattern, and a calculation of selecting a numerical value such as the last digit, any digit after the decimal point, or a remainder of the numerical value of the calculation result. The calculation executed by the calculation unit 124 is not limited to the method described above as long as the calculation is shared between the user and the authentication device 12.

The authentication unit 125 compares the key code calculated by the user being authenticated with the key code calculated by the calculation unit 124, and determines whether the user can be authenticated. When the key code calculated by the user matches the key code calculated by the calculation unit 124, the authentication unit 125 generates an authentication result of authenticating the user. On the other hand, when the key code calculated by the user does not match the key code calculated by the calculation unit 124, the authentication unit 125 generates an authentication result indicating that the user is not authenticated. The authentication result by the authentication unit 125 is transmitted to the input terminal 11 operated by the user being authenticated.

[Shared Information]

Next, the shared information shared between the user and the authentication device 12 will be described with some examples. The following example is an example, and is not limited to shared information shared between the user and the authentication device 12.

First Example

Figure 7:
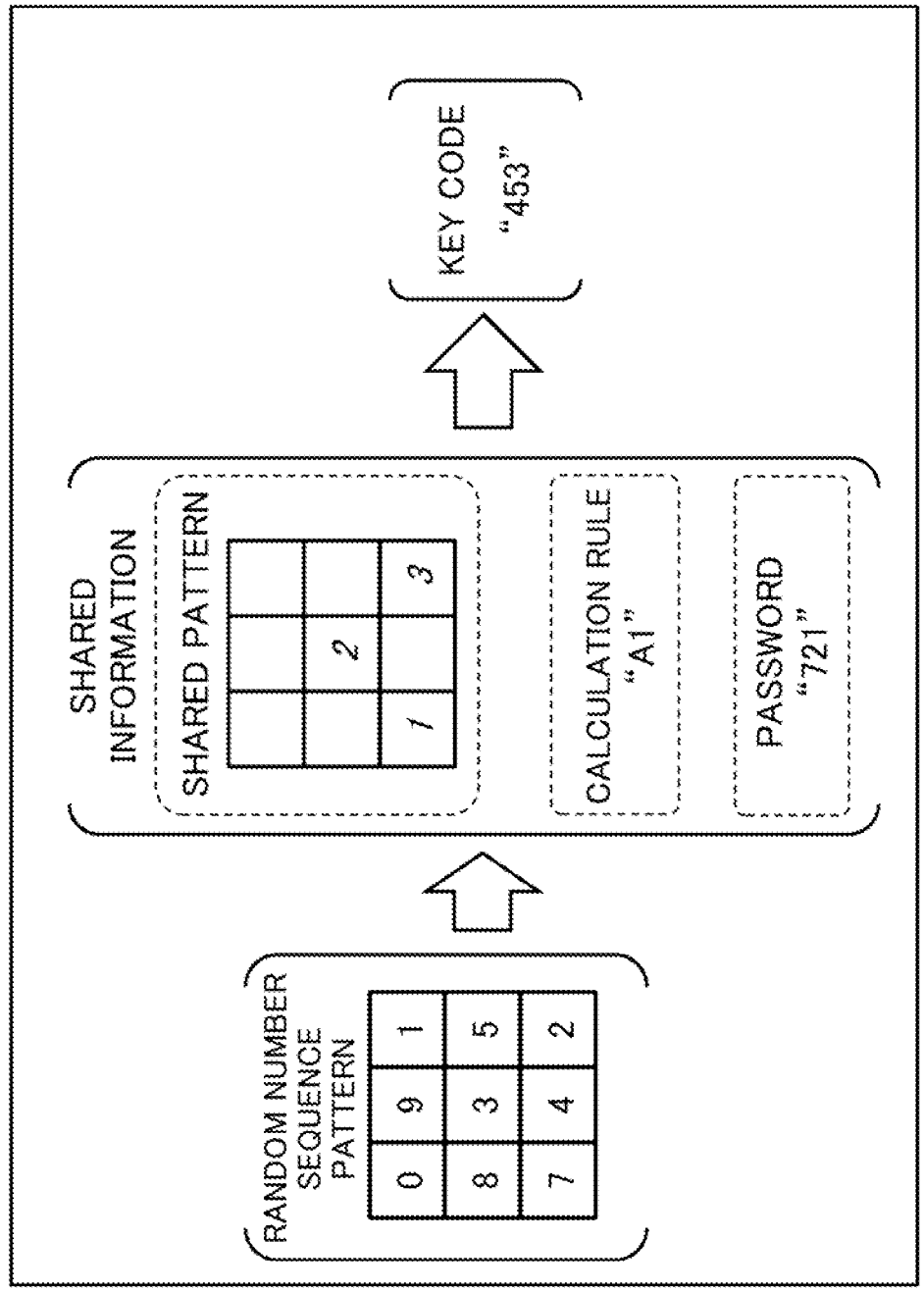
FIG. 7 is a conceptual diagram for describing an example of calculation of a key code by the authentication device of the authentication system of the first example embodiment.

First, a first example of shared information will be described with reference to the drawings. FIGS. 6 and 7 relate to the first example of the shared information shared between the user and the authentication device 12. FIG. 6 is a shared information table (shared information table 131) illustrating an example of the shared information stored in the storage unit 123 in the first example. The shared information table 131 stores the shared information for each user ID (also referred to as identification information). FIG. 7 is a conceptual diagram for explaining the operation of the key code in the first example.

Hereinafter, the user ID "AAA" will be described by way of example, and the description of the user ID "BBB" and the user ID "CCC" will be omitted.

For example, a password "721", a shared pattern of the user ID "AAA", and a calculation rule "A1" are associated with the user ID "AAA". The shared pattern with the user ID "AAA" indicates that, in a random number sequence pattern of 3 rows×3 columns, the first provisional numeral is selected from the first column in the third row, the second provisional numeral is selected from the second column in the second row, and the third provisional numeral is selected from the third column in the third row. The calculation rule "A1" is defined as adding the first provisional numeral to the first secret numeral, adding the second provisional numeral to the second secret numeral, adding the third provisional numeral to the third secret numeral, and selecting the last digit of these numerical values.

Here, an example of calculating the key code based on the shared information of the user ID "AAA" using the random number sequence pattern in the first example will be described with reference to FIG. 7.

In the example of FIG. 7, based on the random number sequence pattern and the shared pattern, the first provisional numeral is "7", the second provisional numeral is "3", and the third provisional numeral is "2". The first key numeral of the key code is "4" which is the first numeral of "14" which is a numerical value obtained by adding "7" which is the first secret numeral of the password and "7" which is the first provisional numeral. The second key numeral of the key code is "5" which is the first numeral of "5" which is a numerical value obtained by adding "2" which is the second secret numeral of the password and "3" which is the second provisional numeral. The third key numeral of the key code is "3" which is the first numeral of "3" which is a numerical value obtained by adding "1" which is the third secret numeral of the password and "2" which is the third provisional numeral. That is, the key code is "453".

According to the first example, even if the input of the key code by the user is intercepted, since the regularity of the key code cannot be specified, there is no possibility that the password of the user is leaked. For example, when 9 numerals are selected from 10 numerals of 0 to 9 as the random number sequence pattern, the numeral corresponding to the key code may not be included in the random number sequence pattern. In such a case, the random number sequence pattern may be regenerated in response to a request from the user.

Second Example

Figure 9:
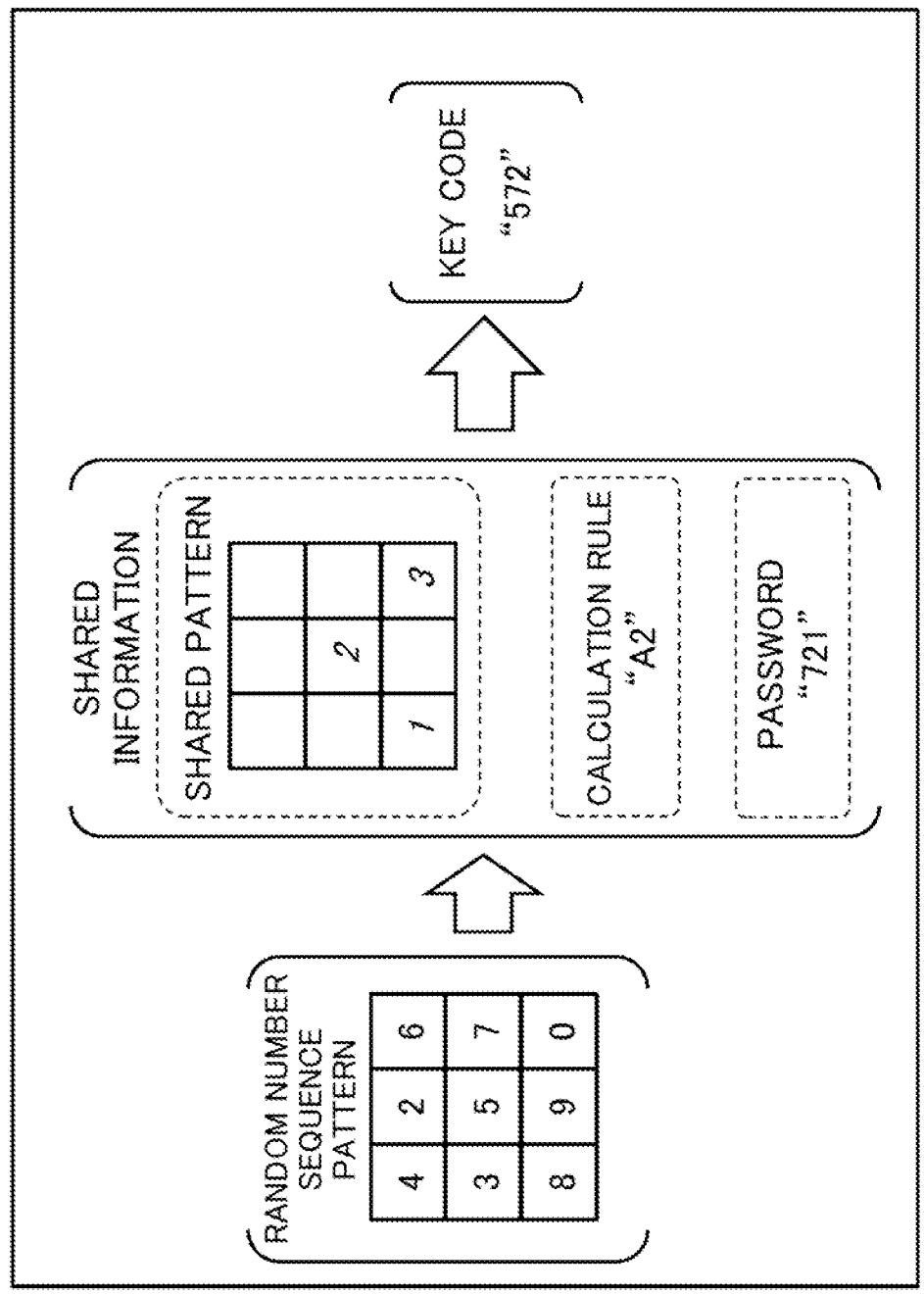
FIG. 9 is a conceptual diagram for describing an example of calculation of the key code by the authentication device of the authentication system of the first example embodiment.

Next, a second example of the shared information will be described with reference to the drawings. In the first example, since 9 different numerals are selected from 10 numerals of 0 to 9, the calculated key numeral may not be included in the random number sequence pattern. The second example is an example corresponding to a case where the calculated key numeral is not included in the random number sequence pattern. FIGS. 8 and 9 relate to a second example of the shared information shared between the user and the authentication device 12. FIG. 8 is a shared information table (shared information table 132) illustrating an example of the shared information stored in the storage unit 123 in the second example. The shared information table 132 stores the shared information for each user ID. FIG. 9 is a conceptual diagram for describing the calculation of the key code in the second example.

For example, a password "721", a shared pattern of the user ID "AAA", and a calculation rule "A2" are associated with the user ID "AAA". The shared pattern with the user ID "AAA" indicates that, in a random number sequence pattern of 3 rows×3 columns, the first provisional numeral is selected from the first column in the third row, the second provisional numeral is selected from the second column in the second row, and the third provisional numeral is selected from the third column in the third row. The calculation rule "A2" includes two calculations. The first calculation included in the calculation rule "A2" is a calculation of adding the first provisional numeral to the first secret numeral, adding the second provisional numeral to the second secret numeral, adding the third secret numeral to the third provisional numeral, and selecting the last digit number of these numerical values. The second calculation included in the calculation rule "A2" is a calculation in which, when the selected numeral is not included in the random number sequence pattern, 1 is added to the numeral. As described above, the calculation rule may be a combination of a plurality of calculations. Here, an example of calculating the key code based on the shared information of the user ID "AAA" using the random number sequence pattern in the second example will be described with reference to FIG. 9.

In the example of FIG. 9, based on the random number sequence pattern and the shared pattern, the first provisional numeral is "8", the second provisional numeral is "5", and the third provisional numeral is "0". The first key numeral of the key code is "5" which is the first numeral of "15" which is a numerical value obtained by adding "7" which is the first secret numeral of the password and "8" which is the first provisional numeral. The second key numeral of the key code is "7" which is the first numeral of "7" which is a numerical value obtained by adding "2" which is the second secret numeral of the password and "5" which is the second provisional numeral. The third key numeral of the key code should be "1" which is the first numeral of "1" which is a numerical value obtained by adding "1" which is the third secret numeral of the password and "0" which is the third provisional numeral. However, since "1" is not included in the random number sequence pattern, "2" that is a numerical value obtained by adding 1 to "1" of the first numeral of "1" which is a numerical value obtained by adding "1" which is the third secret numeral of the password and "0" which is the third provisional numeral is the third key numeral. That is, the key code is "572".

According to the second example, it is also possible to cope with a case where the numeral included in the key code calculated by the method of the first example is not included in the random number sequence pattern. According to the second example, since the calculation rule in which a plurality of calculations are combined is used, the possibility of leakage of the authentication information of the user is further reduced.

Third Example

Figure 11:
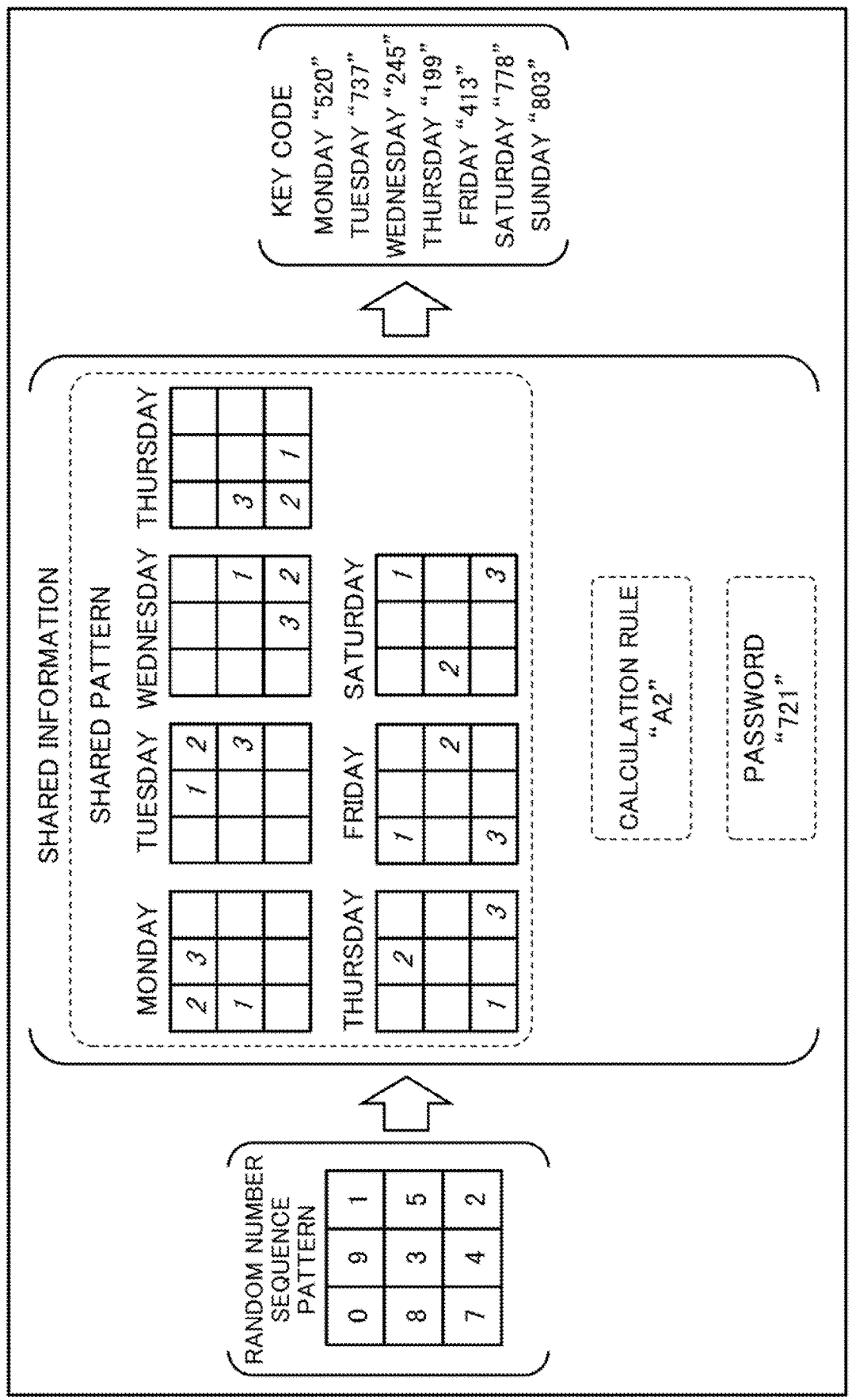
FIG. 11 is a conceptual diagram for describing an example of calculation of the key code by the authentication device of the authentication system of the first example embodiment.

Next, a third example of the shared information will be described with reference to the drawings. The third example is an example in which the shared pattern is changed on a daily basis. FIGS. 10 and 11 relate to the third example of the shared information shared between the user and the authentication device 12. FIG. 10 is a shared information table (shared information table 133) illustrating an example of shared information stored in the storage unit 123 in the third example. The shared information table 133 stores the shared information for each user ID. FIG. 11 is a conceptual diagram for describing the calculation of the key code in the third example.

For example, a password "721", a daily shared pattern of the user ID "AAA", and a calculation rule "A2" are associated with the user ID "AAA". The shared pattern of the user ID "AAA" is set on a daily basis in association with the day of the week, such as Monday, Tuesday, Wednesday, . . . . In FIG. 10, the shared patterns of Thursday, Friday, Saturday, and Sunday are omitted. The shared pattern of "Monday" indicates that, in the random number sequence pattern of 3 rows×3 columns, the first provisional numeral is selected from the first column in the second row, the second provisional numeral is selected from the first column in the first row, and the third provisional numeral is selected from the second column in the first row. The shared pattern of "Tuesday" indicates that, in the random number sequence pattern of 3 rows×3 columns, the first provisional numeral is selected from the second column in the first row, the second provisional numeral is selected from the third column in the first row, and the third provisional numeral is selected from the third column in the second row. The shared pattern of "Wednesday" indicates that, in the random number sequence pattern of 3 rows×3 columns, the first provisional numeral is selected from the third column in the second row, the second provisional numeral is selected from the third column in the third row, and the third provisional numeral is selected from the second column in the third row. The calculation rule "A2" includes two calculations. The first calculation included in the calculation rule "A2" is a calculation of adding the first provisional numeral to the first secret numeral, adding the second provisional numeral to the second secret numeral, adding the third secret numeral to the third provisional numeral, and selecting the last digit number of these numerical values. The second calculation included in the calculation rule "A2" is a calculation in which, when the selected numeral is not included in the random number sequence pattern, 1 is added to the numeral.

Here, an example of calculating the key code based on the shared information of the user ID "AAA" using the random number sequence pattern in the third example will be described with reference to FIG. 11. In the following example, description of Thursday, Friday, Saturday, and Sunday is omitted. In practice, the sequence of the random number sequence pattern is generated for each authentication, but the same sequence is used for description to simplify the description.

For Monday, based on the random number sequence pattern and the shared pattern for Monday, the first provisional numeral is "8", the second provisional numeral is "0", and the third provisional numeral is "9". The first key numeral of the key code is "5" which is the first numeral of "15" which is a numerical value obtained by adding "7" which is the first secret numeral of the password and "8" which is the first provisional numeral. The second key numeral of the key code is "2" which is the first numeral of "2" which is a numerical value obtained by adding "2" which is the second secret numeral of the password and "0" which is the second provisional numeral. The third key numeral of the key code is "0" which is the first numeral of "10" which is a numerical value obtained by adding "1" which is the third secret numeral of the password and "9" which is the third provisional numeral. That is, the key code for Monday is "520".

For Tuesday, based on the random number sequence pattern and the shared pattern for Tuesday, the first provisional numeral is "9", the second provisional numeral is "1", and the third provisional numeral is "5". The first key numeral of the key code should be "6" which is the first numeral of "16" which is a numerical value obtained by adding "7" which is the first secret numeral of the password and "9" which is the first provisional numeral. However, since "6" is not included in the random number sequence pattern, "7" which is a numerical value obtained by adding 1 to "6" of the first numeral of "16" which is a numerical value obtained by adding "7" which is the first secret numeral of the password and "9" which is the first provisional numeral becomes the first key numeral. The second key numeral of the key code is "3" which is the first numeral of "3" which is a numerical value obtained by adding "2" which is the second secret numeral of the password and "1" which is the second provisional numeral. The third key numeral of the key code should be "6" which is the first numeral of "6" which is a numerical value obtained by adding "1" which is the third secret numeral of the password and "5" which is the third provisional numeral. However, since "6" is not included in the random number sequence pattern, "7" which is a numerical value obtained by adding 1 to "6" which is the first numeral of "6" which is a numerical value obtained by adding "1" which is the third secret numeral of the password and "5" which is the third provisional numeral is the third key numeral. That is, the key code for Tuesday is "727".

Similarly, a key code on Wednesday is "245", a key code on Thursday is "199", a key code on Friday is "413", a key code on Saturday is "778", and a key code on Sunday is "803". In practice, since the sequence of numerals included in the random number sequence pattern is newly generated for each authentication, the provisional numeral based on the shared pattern for each day of the week is selected from different random number sequence patterns. According to the third example, since the shared pattern changes on a daily basis, even if the key input is continuously stolen for several weeks, the possibility that the password is leaked is extremely low.

Fourth Example

Figure 13:
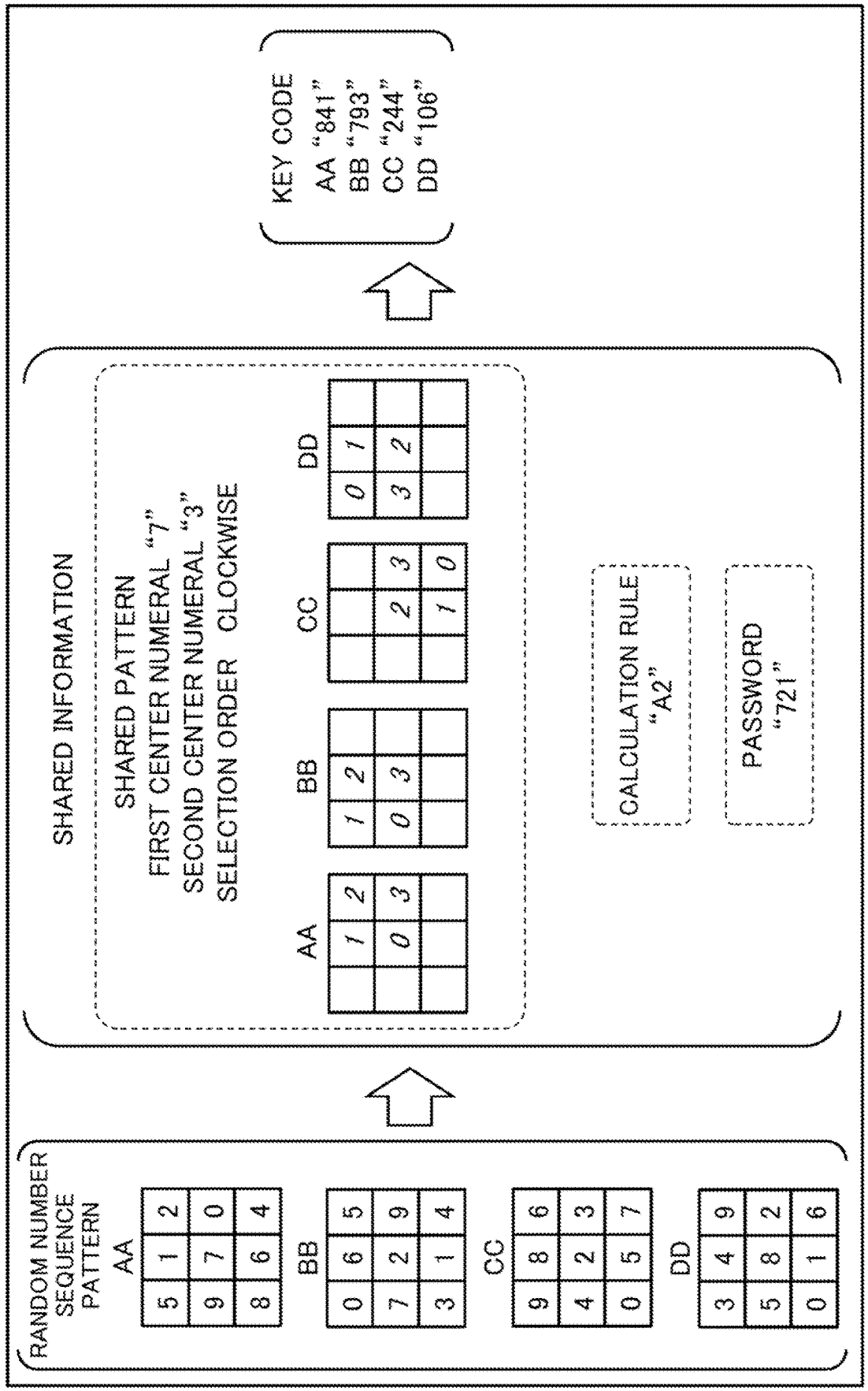
FIG. 13 is a conceptual diagram for describing an example of calculation of the key code by the authentication device of the authentication system of the first example embodiment.

Next, a fourth example of the shared information will be described with reference to the drawings. The fourth example is an example in which a pattern for selecting a provisional numeral starting from any numeral included in the random number sequence pattern is used as the shared pattern instead of the position and order of selecting the provisional numeral in the matrix of the random number sequence pattern. FIGS. 12 and 13 relate to the fourth example of the shared information shared between the user and the authentication device 12. FIG. 12 is a shared information table (shared information table 134) illustrating an example of the shared information stored in the storage unit 123 in the fourth example. The shared information table 134 stores the shared information for each user ID. FIG. 13 is a conceptual diagram for describing the operation of the key code in the fourth example. Hereinafter, the user ID "AAA" will be described by way of example, and the description of the user ID "BBB" and the user ID "CCC" will be omitted.

For example, a password "721", a shared pattern of the user ID "AAA", and a calculation rule "A2" are associated with the user ID "AAA". The shared pattern of the user ID "AAA" includes a first center numeral "7", a second center numeral "3", and a selection order of the provisional numeral "clockwise". The calculation rule "A2" includes two calculations. The first calculation included in the calculation rule "A2" is a calculation of adding the first provisional numeral to the first secret numeral, adding the second provisional numeral to the second secret numeral, adding the third secret numeral to the third provisional numeral, and selecting the last digit number of these numerical values. The second calculation included in the calculation rule "A2" is a calculation in which, when the selected numeral is not included in the random number sequence pattern, 1 is added to the numeral.

The first center numeral "7" is a numeral that becomes a center when a provisional numeral is selected from the random number sequence pattern. For example, when "7" is included in the random number sequence pattern, the provisional numerals are sequentially selected in the clockwise order around "7". The second center numeral "3" is a numeral that becomes the center when a provisional numeral is selected from the random number sequence pattern when the first center numeral "7" is not included in the random number sequence pattern. For example, when "7" is not included in the random number sequence pattern, the provisional numerals are sequentially selected in the clockwise order around "3". As the first to third provisional numerals, consecutive numbers are selected in the clockwise order around the center numeral included in the random number sequence pattern. The priority order of selection of the provisional numeral is, around the center numeral, in the clockwise order of above, upper right, right, lower right, below, lower left, left, and upper left. For example, in the random number sequence pattern, the numeral above the center numeral is selected as the first provisional numeral, the numeral on the upper right of the center numeral is selected as the second provisional numeral, and the numeral on the right of the center numeral is selected as the third provisional numeral. For example, when there is no numeral above the center numeral in the random number sequence pattern, the numeral on the right of the center numeral is selected as the first provisional numeral, the numeral on the lower right of the center numeral is selected as the second provisional numeral, and the numeral below the center numeral is selected as the third provisional numeral. For example, when there is no numeral on the right of the center numeral in the random number sequence pattern, the numeral below the center numeral is selected as the first provisional numeral, the numeral on the lower left of the center numeral is selected as the second provisional numeral, and the numeral on the left of the center numeral is selected as the third provisional numeral. For example, in the random number sequence pattern, when there is no numeral below the center numeral, the numeral on the left of the center numeral is selected as the first provisional numeral, the numeral on the upper left of the center numeral is selected as the second provisional numeral, and the numeral above the center numeral is selected as the third provisional numeral. In a case where the selection order of the provisional numeral included in the shared pattern is "counterclockwise", the priority order of selection of the provisional numeral is, around the center numeral, the counterclockwise order of above, upper left, left, lower left, lower, lower right, right, and upper right.

Here, an example of calculating a key code based on the shared information of the user ID "AAA" using the random number sequence pattern in the fourth example will be described with reference to FIG. 13. In the following example, an example of generating a key code for each of the random number sequence patterns AA, BB, CC, and DD will be described. In the following description, an example will be described in which when a provisional numeral is selected from the random number sequence pattern, the provisional numeral is selected in the clockwise order around the center numeral. In FIG. 13, a pattern corresponding to each random number sequence pattern is illustrated in a portion of the shared pattern. Symbols "AA", "BB", "CC", and "DD" above the shared pattern indicate corresponding random number sequence patterns.

The random number sequence pattern "AA" includes a first center numeral "7". Therefore, regarding the random number sequence pattern "AA", based on the shared pattern, "1" above the first center numeral "7" is the first provisional numeral, the second provisional numeral is "2", and the third provisional numeral is "0". The first key numeral of the key code is "8" which is the first numeral of "8" which is a numerical value obtained by adding "7" which is the first secret numeral of the password and "1" which is the first provisional numeral. The second key numeral of the key code is "4" which is the first numeral of "4" which is a numerical value obtained by adding "2" which is the second secret numeral of the password and "2" which is the second provisional numeral. The third key numeral of the key code is "1" which is the first numeral of "1" which is a numerical value obtained by adding "1" which is the third secret numeral of the password and "0" which is the third provisional numeral. That is, the key code is "841" when the random number sequence pattern "AA" is used.

The random number sequence pattern "BB" includes the first center numeral "7". Therefore, regarding the random number sequence pattern "BB", based on the shared pattern, "0" above the first center numeral "7" is the first provisional numeral, the second provisional numeral is "6", and the third provisional numeral is "2". The first key numeral of the key code is "7" which is the first numeral of "7" which is a numerical value obtained by adding "7" which is the first secret numeral of the password and "0" which is the first provisional numeral. The second key numeral of the key code is "8" which is the first numeral of "8" which is a numerical value obtained by adding "2" which is the second secret numeral of the password and "6" which is the second provisional numeral. However, since "8" is not included in the random number sequence pattern "BB", "9" which is a numerical value obtained by adding 1 to "8" which is the first numeral of "8" which is a numerical value obtained by adding "2" which is the second secret numeral of the password and "6" which is the second provisional numeral is the second key numeral. The third key numeral of the key code is "3" which is the first numeral of "3" which is a numerical value obtained by adding "1" which is the third secret numeral of the password and "2" which is the third provisional numeral. That is, the key code in the case of using the random number sequence pattern "BB" is "793".

The random number sequence pattern "CC" includes the first center numeral "7", but since there is no numeral on the right and below the first center numeral "7", the provisional numeral cannot be selected in the clockwise order from the numeral above the first center numeral "7". Therefore, regarding the random number sequence pattern "CC", based on the shared pattern, "5" on the left of the first center numeral "7" is the first provisional numeral, the second provisional numeral is "2", and the third provisional numeral is "3". The first key numeral of the key code is "2" which is the first numeral of "12" which is a numerical value obtained by adding "7" which is the first secret numeral of the password and "5" which is the first provisional numeral. The second key numeral of the key code is "4" which is the first numeral of "4" which is a numerical value obtained by adding "2" which is the second secret numeral of the password and "2" which is the second provisional numeral. The third key numeral of the key code is "4" which is the first numeral of "4" which is a numerical value obtained by adding "1" which is the third secret numeral of the password and "3" which is the third provisional numeral. That is, the key code in the case of using the random number sequence pattern "CC" is "244".

Since the random number sequence pattern "DD" does not include the first center numeral "7", the second center numeral "3" is the center numeral. Therefore, regarding the random number sequence pattern "DD", based on the shared pattern, "4" on the right of the second center numeral "3" is the first provisional numeral, the second provisional numeral is "8", and the third provisional numeral is "5". The first key numeral of the key code is "1" which is the first numeral of "11" which is a numerical value obtained by adding "7" which is the first secret numeral of the password and "4" which is the first provisional numeral. The second key numeral of the key code is "0" which is the first numeral of "10" which is a numerical value obtained by adding "2" which is the second secret numeral of the password and "8" which is the second provisional numeral. The third key numeral of the key code is "6" which is the first numeral of "6" which is a numerical value obtained by adding "1" which is the third secret numeral of the password and "5"

which is the third provisional numeral. That is, the key code in the case of using the random number sequence pattern "DD" is "106".

According to the fourth example, since the selection rule of the provisional numeral according to the shared pattern is very complicated, the possibility of leakage of the password is extremely low even if the key input is continuously stolen.

Fifth Example

Figure 15:
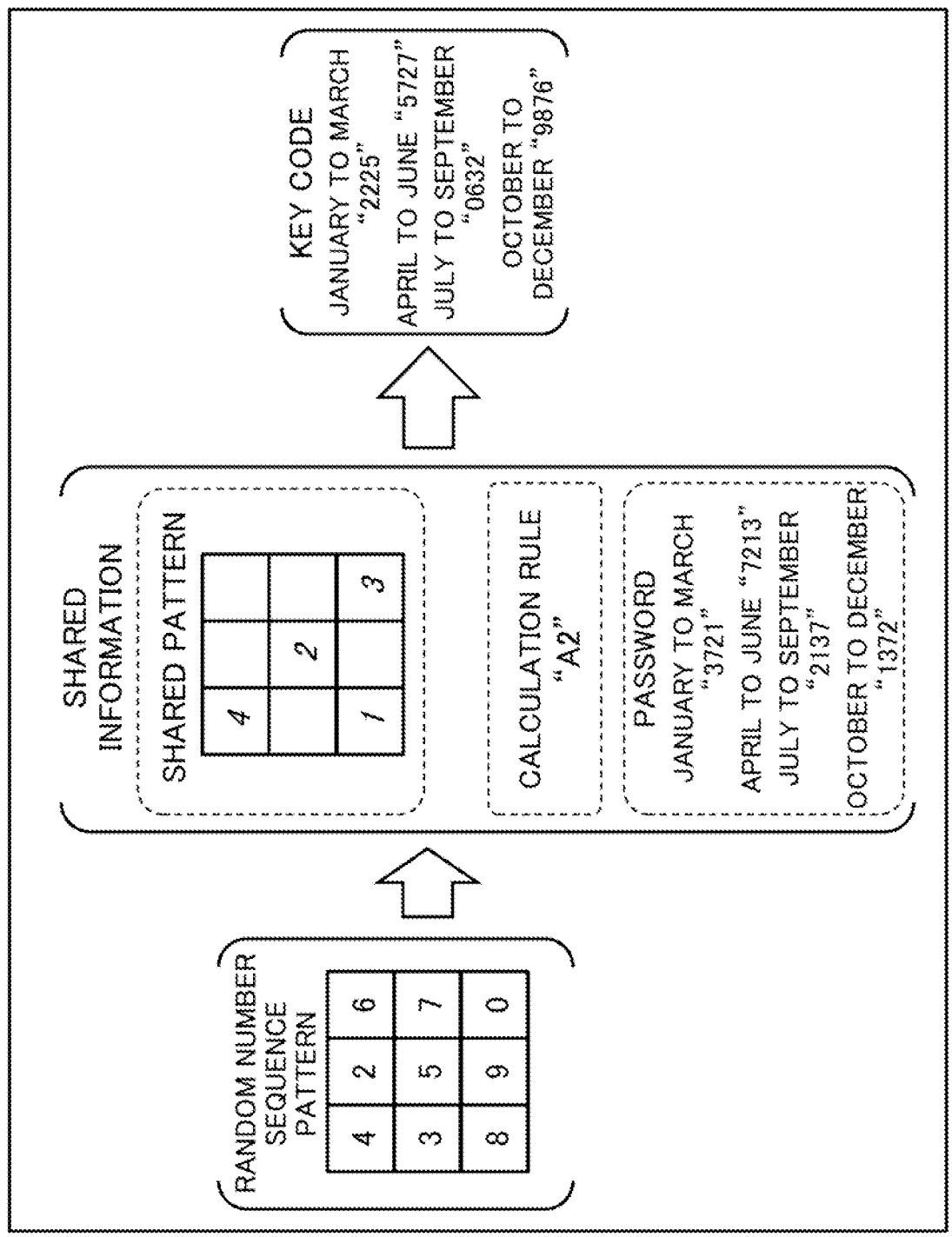
FIG. 15 is a conceptual diagram for describing an example of calculation of the key code by the authentication device of the authentication system of the first example embodiment.

Next, a fifth example of the shared information will be described with reference to the drawings. The fifth example is an example in which the password is changed every predetermined period. FIGS. 14 and 15 relate to the fifth example of the shared information shared between the user and the authentication device 12. FIG. 14 is a shared information table (shared information table 135) illustrating an example of the shared information stored in the storage unit 123 in the fifth example. The shared information table 135 stores the shared information for each user ID. FIG. 15 is a conceptual diagram for describing the calculation of the key code in the fifth example. Hereinafter, the user ID "AAA" will be described by way of example, and the description of the user ID "BBB" and the user ID "CCC" will be omitted.

For example, a password that is changed according to a predetermined rule every predetermined period, a shared pattern of the user ID "AAA", and a calculation rule "A2" are associated with the user ID "AAA". The password of the user ID "AAA" is "3721" in the period from January to March, "7213" in the period from April to June, "2137" in the period from July to September, and "1372" in the period from October to December. In the example of FIG. 14, the password is changed by moving the leading numeral of the password to the end every predetermined period. The rule for changing the password is not limited to the example described herein as long as the rule is shared between the user and the authentication device 12. For example, the password may be changed monthly or weekly. For example, the password may not be changed every predetermined period, but may be irregularly changed according to some rule.

The shared pattern with the user ID "AAA" indicates that, in a random number sequence pattern of 3 rows×3 columns, the first provisional numeral is selected from the first column in the third row, the second provisional numeral is selected from the second column in the second row, the third provisional numeral is selected from the third column in the third row, and the fourth provisional numeral is selected from the first column in the first row. The calculation rule "A2" includes two calculations. The first calculation included in the calculation rule "A2" is a calculation of adding the first provisional numeral to the first secret numeral, adding the second provisional numeral to the second secret numeral, adding the third secret numeral to the third provisional numeral, and selecting the last digit number of these numerical values. The second calculation included in the calculation rule "A2" is a calculation in which, when the selected numeral is not included in the random number sequence pattern, 1 is added to the numeral.

Here, an example of calculating a key code based on the shared information of the user ID "AAA" using the random number sequence pattern in the fifth example will be described with reference to FIG. 15. The following example illustrates an example of generating a key code for a password in each of the periods of January to March, April to June, July to September, and October to December. In the example of FIG. 15, based on the random number sequence pattern and the shared pattern, the first provisional numeral is "8", the second provisional numeral is "5", the third provisional numeral is "0", and the fourth provisional numeral is "4".

For January to March, the first key numeral of the key code should be "1" of the first numeral of "11" which is a numerical value obtained by adding "3" which is the first secret numeral of the password and "8" which is the first provisional numeral. However, since "1" is not included in the random number sequence pattern, "2" which is a numerical value obtained by adding 1 to "1" of the first numeral of "11" which is a numerical value obtained by adding "3" which is the first secret numeral of the password and "8" which is the first provisional numeral is the first key numeral. The second key numeral of the key code is "2" which is the first numeral of "12" which is a numerical value obtained by adding "7" which is the second secret numeral of the password and "5" which is the second provisional numeral. The third key numeral of the key code is "2" which is the first numeral of "2" which is a numerical value obtained by adding "2" which is the third secret numeral of the password and "0" which is the third provisional numeral. The fourth key numeral of the key code is "5" which is the first numeral of "5" which is a numerical value obtained by adding "1" which is the fourth secret numeral of the password and "4" which is the fourth provisional numeral. That is, the key code is "2225".

For April to June, the first key numeral of the key code is "5" which is the first numeral of "15" which is a numerical value obtained by adding "7" which is the first secret numeral of the password and "8" which is the first provisional numeral. The second key numeral of the key code is "7" which is the first numeral of "7" which is a numerical value obtained by adding "2" which is the second secret numeral of the password and "5" which is the second provisional numeral. The third key numeral of the key code is "2" which is the first numeral of "2" which is a numerical value obtained by adding "2" which is the third secret numeral of the password and "0" which is the third provisional numeral. The fourth key numeral of the key code is "7" which is the first numeral of "7" which is a numerical value obtained by adding "3" which is the fourth secret numeral of the password and "4" which is the fourth provisional numeral. That is, the key code is "5727".

Similarly, the key code in July to September is "0632", and the key code in October to December is "9876". In practice, since the sequence of numerals included in the random number sequence pattern is newly generated for each authentication, the provisional numeral based on the shared pattern is selected from different random number sequence patterns. According to the fifth example, since the password changes according to the predetermined rule when the predetermined period elapses, the possibility of leakage of the password is extremely low even if the key input is continuously stolen over many months.

The examples of the shared information may be arbitrarily combined. For example, if the shared pattern is changed on a daily basis and the password is changed according to a predetermined rule every predetermined period, it is very difficult to estimate the password from the key code input by the user.

Figure 16:
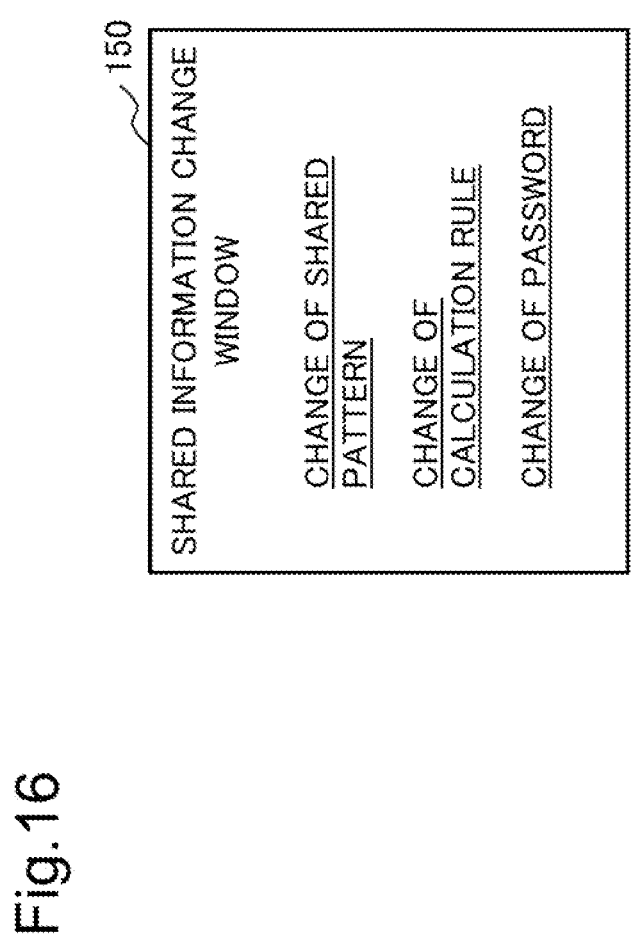
FIG. 16 is a conceptual diagram illustrating an example of a shared information change screen for changing shared information stored in the storage unit of the authentication device of the authentication system of the first example embodiment.

FIG. 16 illustrates an example of a window (shared information change window 150) that accepts a change in the shared pattern, the calculation rule, and the password. For example, the shared information change window 150 can be accessed from a link displayed on a web page or the like of a system using the authentication system 1. When the shared information including the shared pattern, the calculation rule, and the password is simultaneously displayed on the same screen, the shared information is easily associated with each other. Therefore, the shared information may be displayed on different screens. Therefore, in the shared information change window 150, only a link to a window for changing the shared pattern, the calculation rule, and the password may be displayed. For example, when "change of shared pattern" is clicked, the shared pattern can be changed on the linked screen. For example, when "change of calculation rule" is clicked, the calculation rule can be changed on the linked screen. For example, when "change of password" is clicked, the password can be changed on the linked screen. The shared pattern, the calculation rule, and the password changed at these link destinations may be shared between the user and the authentication device 12.

(Operation)

Next, an operation of the authentication system 1 of the present example embodiment will be described with reference to the drawings. Hereinafter, an example in which each of the input terminal 11 and the authentication device 12 constituting the authentication system 1 is an operation subject will be described.

[Input Terminal]

Figure 17:
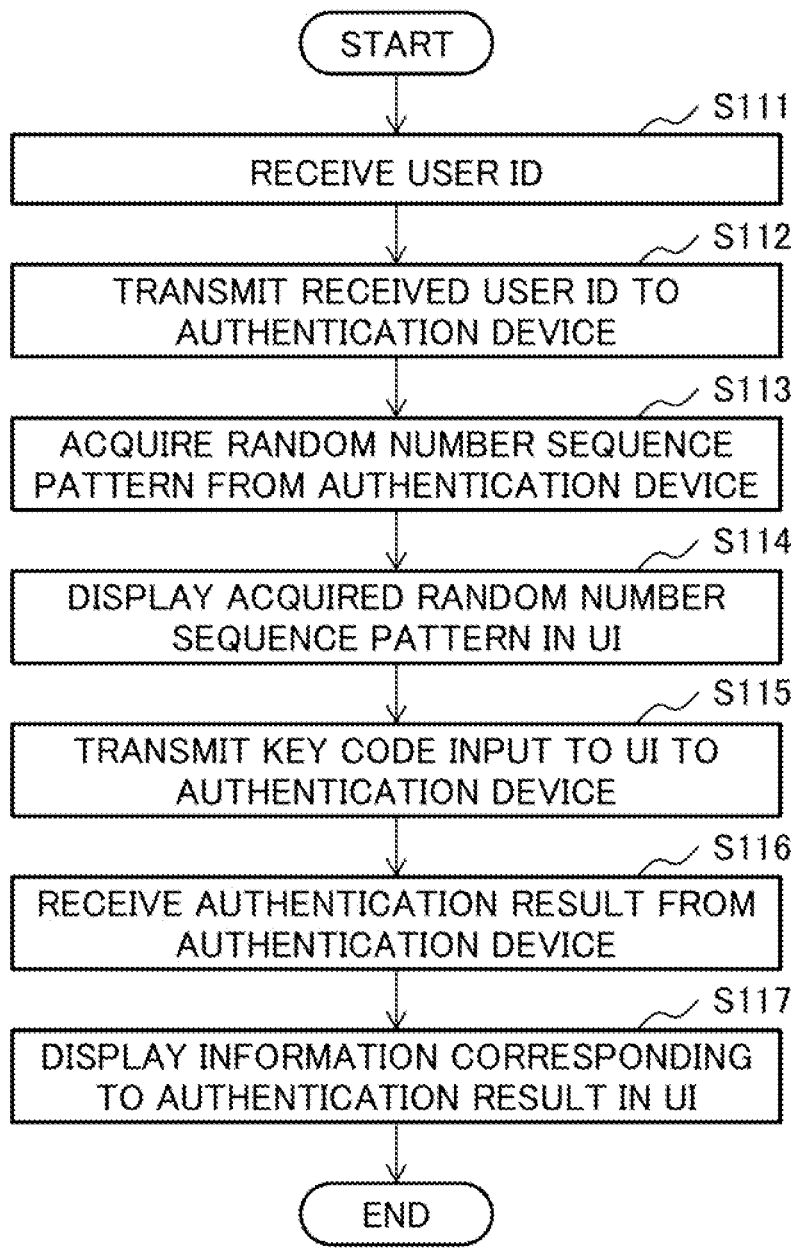
FIG. 17 is a flowchart for describing an example of the operation of the input terminal of the authentication system of the first example embodiment.

FIG. 17 is a flowchart for describing the operation of the input terminal 11. In the description along the flowchart of FIG. 17, the input terminal 11 will be described as an operation subject.

In FIG. 17, first, the input terminal 11 receives a user ID of a user to be authenticated (step S111). For example, the input terminal 11 detects, as the start of the authentication operation, insertion of an authentication card into the input terminal 11 or input of ID information on an authentication dedicated page or the like on the web.

Next, the input terminal 11 transmits the received user ID to the authentication device 12 (step S112).

Next, the input terminal 11 acquires the random number sequence pattern transmitted according to the user ID transmitted from the input terminal itself from the authentication device 12 (step S113).

Next, the input terminal 11 displays the acquired random number sequence pattern on the UI 111 of the input terminal itself (step S114). A key code consisting of a numeral selected based on the shared rule by the user to be authenticated is input to the input terminal 11.

Next, the input terminal 11 transmits the key code input by the user to the authentication device 12 (step S115).

Next, the input terminal 11 receives an authentication result from the authentication device 12 (step S116).

Next, the input terminal 11 causes the UI 111 to display information corresponding to the authentication result (step S117). For example, in a case where authentication is performed by the authentication device 12, a service corresponding to the authentication result is provided to the user to be authenticated.

[Face Authentication Device]

Figure 18:
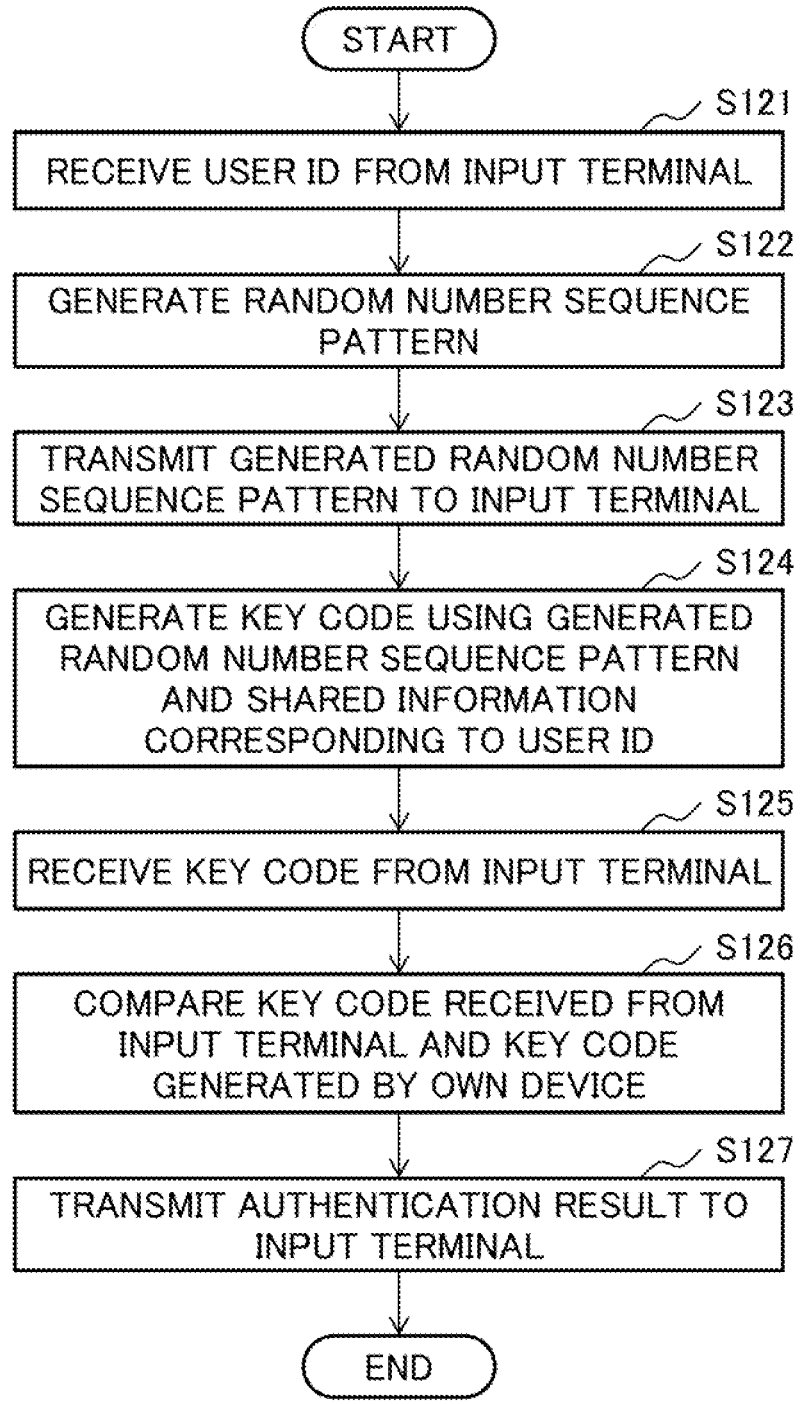
FIG. 18 is a flowchart for describing an example of an operation of the authentication device of the authentication system of the first example embodiment.

FIG. 18 is a flowchart for describing the operation of the authentication device 12. In the description along the flowchart of FIG. 18, the authentication device 12 will be described as an operation subject.

In FIG. 18, first, the authentication device 12 receives the user ID of the user to be authenticated from the input terminal 11 (step S121).

Next, the authentication device 12 generates a random number sequence pattern in association with the user ID (step S122).

Next, the authentication device 12 transmits the generated random number sequence pattern to the input terminal 11 (step S123).

Next, the authentication device 12 generates a key code using the generated random number sequence pattern and the shared information associated to the user ID (step S124).

Next, the authentication device 12 receives the key code from the input terminal (step S125).

Next, the authentication device 12 compares the key code received from the input terminal 11 with the key code generated by the authentication device itself (step S126). When the key code received from the input terminal 11 matches the key code generated by the authentication device 12, the authentication device generates an authentication result indicating that the user being authenticated is authenticated. When the key code received from the input terminal 11 does not match the key code generated by the authentication device 12, the authentication device generates an authentication result indicating that the user being authenticated is not authenticated.

Next, the authentication device 12 transmits an authentication result to the input terminal 11 (step S127). For example, a system that provides a service to an authenticated user provides a service to a user authenticated by the authentication device 12.

As described above, the authentication system of the present example embodiment includes the input terminal and the authentication device. The input terminal and the authentication device are communicably connected. The input terminal receives identification information of the user to be authenticated, and transmits the received identification information to the authentication device. The authentication device stores shared information including a password and a shared rule preset for each user. The authentication device receives the identification information of the user to be authenticated from the input terminal operated by the user to be authenticated. The authentication device generates a random number sequence pattern including a plurality of different numerals in response to reception of the identification information of the user to be authenticated. The authentication device transmits the generated random number sequence pattern to the input terminal in association with the identification information. The authentication device selects a plurality of provisional numerals from the random number sequence pattern based on the shared rule. The authentication device generates the key code using the plurality of selected provisional numerals and the plurality of secret numerals constituting the password. The input terminal receives the random number sequence pattern generated by the authentication device in association with the identification information from the authentication device. The input terminal displays the random number sequence pattern on the user interface of the input terminal itself. The input terminal transmits the key code selected from the random number sequence pattern to the authentication device via the user interface. The authentication device receives, from the input terminal, the key code consisting of the numeral selected by the user to be authenticated from the random number sequence pattern based on the shared rule. The authentication device authenticates the user to be authenticated based on the key code received from the input terminal and the key code generated by the authentication device itself.

The authentication device includes a transmission/reception unit, a random number sequence generation unit, a storage unit, a calculation unit, and an authentication unit. The random number sequence generation unit generates a random number sequence pattern including a plurality of different numerals for each authentication opportunity of the user to be authenticated. The calculation unit selects a plurality of provisional numerals from the random number sequence pattern based on the shared rule, and generates the key code using the plurality of selected provisional numerals and the plurality of secret numerals constituting the password. The transmission/reception unit receives the identification information of the user to be authenticated from the input terminal operated by the user to be authenticated in the authentication opportunity of the user to be authenticated. The transmission/reception unit transmits the random number sequence pattern generated in the authentication opportunity of the user to be authenticated to the input terminal in association with the identification information. The transmission/reception unit receives, from the input terminal, the key code consisting of the numeral selected by the user to be authenticated from the random number sequence pattern based on the shared rule. The authentication unit authenticates the user to be authenticated based on the key code received from the input terminal and the key code generated by the calculation unit.

In an aspect of the present example embodiment, the storage unit stores a shared rule including a shared pattern and a calculation rule preset by a user. The shared pattern is a pattern indicating an order of selecting a provisional numeral from a random number sequence pattern in which a plurality of different numerals are arranged in a matrix. The calculation rule is a rule related to the calculation using the provisional numeral selected from the random number sequence pattern and the secret numeral constituting the password.

For example, the storage unit stores a calculation rule including a rule in a case where a numerical value calculated by calculation using a provisional numeral selected from the random number sequence pattern and a secret numeral constituting the password is not included in a plurality of numerals constituting the random number sequence pattern. For example, the calculation rule includes a rule of performing a predetermined calculation on the calculated numerical value.

For example, the storage unit stores a shared pattern that is changed every predetermined period based on a rule shared with the user. For example, the storage unit stores a shared pattern including a reference center numeral and a pattern for selecting a provisional numeral based on the center numeral. For example, the storage unit stores a password that is changed every predetermined period based on a rule shared with the user.

According to the authentication device of the present example embodiment, authentication is performed using the key code calculated using the random number sequence pattern temporarily generated by the authentication device based on the shared information shared between the user and the authentication device, so that leakage of the authentication information can be prevented.

For example, the authentication device of the present example embodiment is used for authentication of an ATM installed in a bank, a post office, a convenience store, a station, or the like. For example, the authentication device of the present example embodiment is used for authentication in payment such as a credit card or online shopping. For example, the authentication device of the present example embodiment is used for authentication in opening and closing a door with a high security level. For example, the authentication device of the present example embodiment may be used in combination with biometric authentication such as fingerprint authentication, vein authentication, face authentication, iris authentication, and gait authentication. The authentication device of the present example embodiment is not limited to the example described herein, and can be applied to arbitrary authentication using authentication information such as a password.

Second Example Embodiment

Next, an authentication system according to a second example embodiment will be described with reference to the drawings. The authentication system of the present example embodiment is different from that of the first example embodiment in that a key code is calculated by a user on an authentication device side and the key code is transmitted to a mobile terminal used by the user.

(Configuration)

Figure 19:
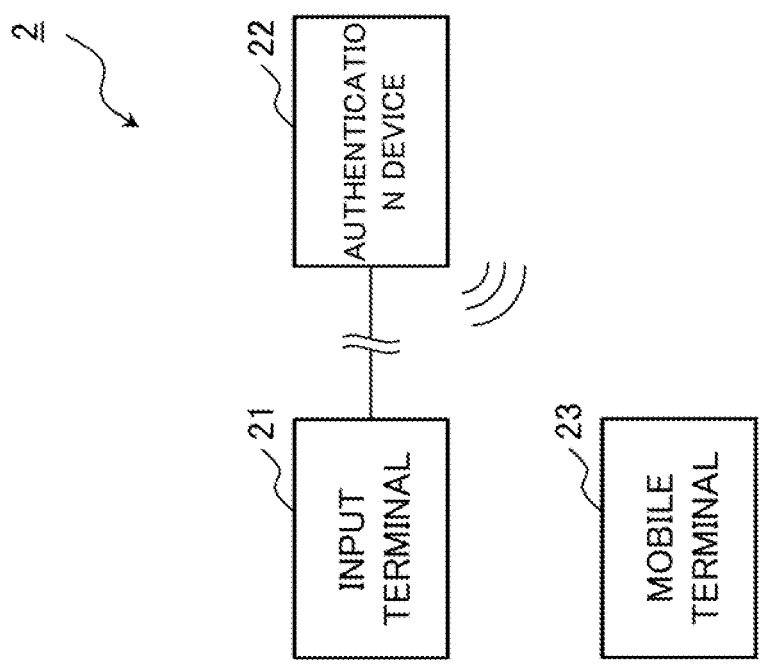
FIG. 19 is a block diagram illustrating an example of a configuration of an authentication system of a second example embodiment.

FIG. 19 is a block diagram illustrating an example of a configuration of an authentication system 2 according to the present example embodiment. The authentication system 2 includes an input terminal 21, an authentication device 22, and a mobile terminal 23. The input terminal 21 and the authentication device 22 are communicably connected via a network such as the Internet. The authentication device 22 and the mobile terminal 23 are communicably connected via a network such as the Internet.

For example, the input terminal 21 is provided as a dedicated terminal such as an ATM installed in a bank, a convenience store, or the like. The input terminal 21 may be provided as application software (hereinafter, the application is also referred to as an application) installed in a mobile terminal such as a personal computer or a smartphone. Since the input terminal 21 is similar to the input terminal 11 of the first example embodiment, a detailed description thereof will be omitted. The authentication device 22 is constructed in a server or a cloud. The authentication device 22 may be hardware or software. The mobile terminal 23 may be a general-purpose mobile device owned by the user or a mobile device dedicated to authentication. In a case where the mobile terminal 23 is implemented by a general-purpose mobile device, the mobile terminal 23 may not be included in the configuration of the authentication system 2.

When detecting the start of the authentication operation by the user, the input terminal 21 transmits the ID information of the user to the authentication device 22. When receiving the ID information of the user from the input terminal 21, the authentication device 22 generates a random number sequence pattern in association with the ID information. The authentication device 22 transmits the generated random number sequence pattern to the input terminal 21 that is the transmission source of the ID information. The input terminal 21 displays the received random number sequence pattern on a user interface (UI) of the input terminal itself.

The authentication device 22 stores shared information shared between the user and the authentication device 22. The shared information includes a password and a shared rule set for each user. The password is authentication information preset by the user. The shared rule is a rule shared between the user and the authentication device 22. The authentication device 22 calculates a key code according to a preset shared rule by using a random number sequence pattern generated at the time of authentication of the user. The authentication device 22 transmits the calculated key code to the mobile terminal 23.

The mobile terminal 23 receives the key code from the authentication device 22. The mobile terminal 23 displays the key code received from the authentication device 22 on the screen of the mobile terminal itself. The mobile terminal 23 deletes the key code displayed on the screen according to the user's operation. When a predetermined time has elapsed, the mobile terminal 23 deletes the key code displayed on the screen. When deleting the key code from the screen, the mobile terminal 23 deletes the key code from the mobile terminal itself.

For example, the mobile terminal 23 may sequentially display the numerals constituting the key code one by one. For example, the mobile terminal 23 may display the numeral constituting the key code according to the operation of the user. For example, the mobile terminal 23 may change and display the display states of the font, size, color, thickness, inclination, enclosure, and the like one by one in order of the numerals constituting the key code. As described above, when the numerals constituting the key code are not collectively displayed or are displayed in different display forms, even if the key code displayed on the screen of the mobile terminal 23 is stolen, the possibility of being identified is reduced.

The user checks the key code displayed on the mobile terminal 23 possessed by the user. The key code is a numeric string input as authentication information by the user in the random number sequence pattern displayed on the UI of the input terminal 21. The user inputs the key code displayed on the mobile terminal 23 to the random number sequence pattern displayed on the UI of the input terminal 21. The input terminal 21 transmits the key code input via the UI to the authentication device 22.

The authentication device 22 receives the key code from the input terminal 21 operated by the user. The authentication device 22 compares the key code received from the input terminal 21 with the key code calculated by the authentication device 22. When the key code received from the input terminal 21 matches the key code calculated by the authentication device 22, the authentication device 22 authenticates the user.

Figure 20:
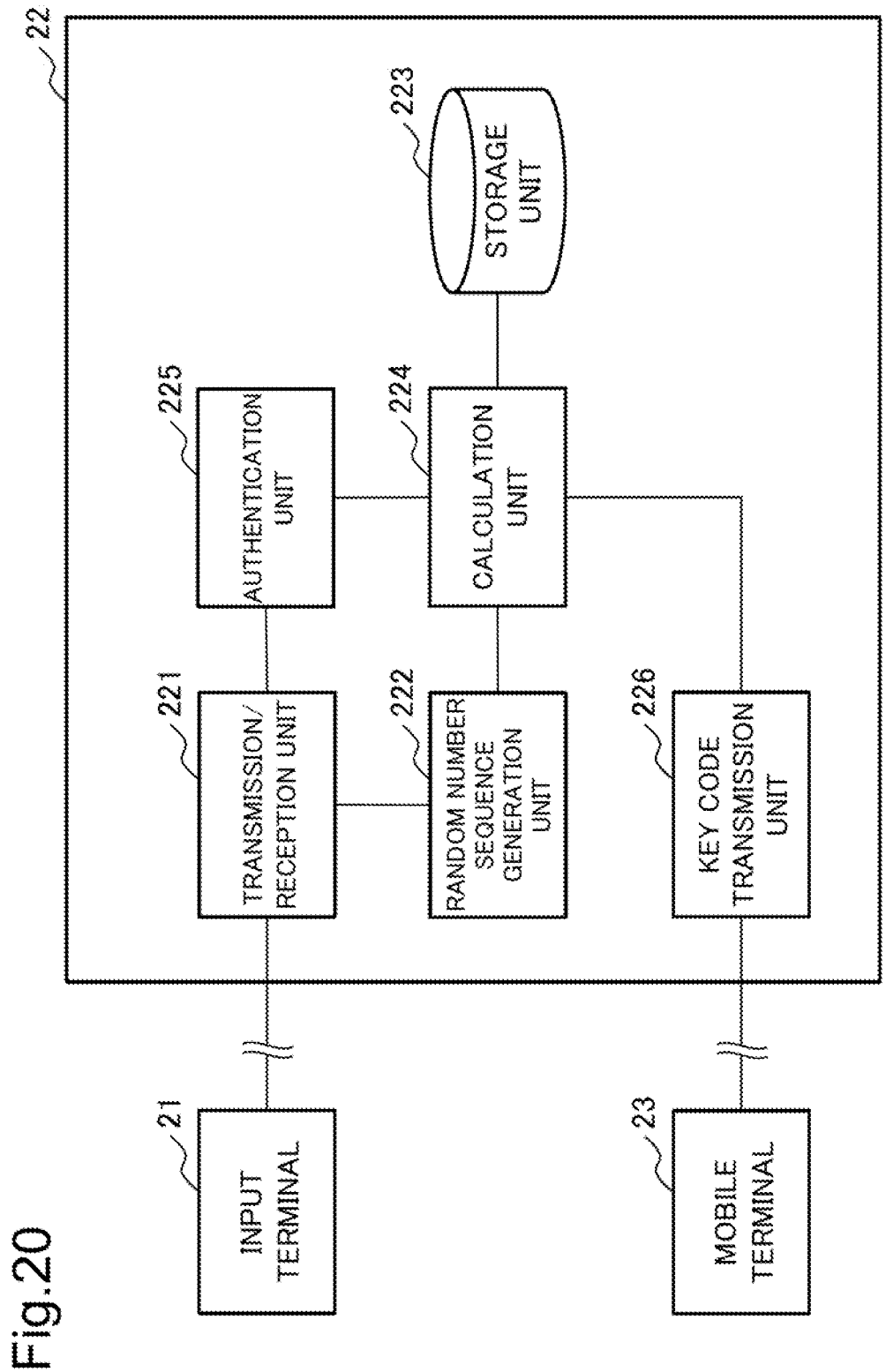
FIG. 20 is a block diagram illustrating an example of a configuration of an authentication device of the authentication system of the second example embodiment.

FIG. 20 is a block diagram illustrating an example of a configuration of the authentication device 22. The authentication device 22 includes a transmission/reception unit 221, a random number sequence generation unit 222, a storage unit 223, a calculation unit 224, an authentication unit 225, and a key code transmission unit 226. FIG. 20 also illustrates the input terminal 21 and the mobile terminal 23 connected to the authentication device 22. Since the transmission/reception unit 221, the random number sequence generation unit 222, the storage unit 223, the calculation unit 224, and the authentication unit 225 are similar to the corresponding configurations included in the authentication device 12 of the first example embodiment, detailed description thereof is omitted.

The key code transmission unit 226 transmits the key code calculated by the calculation unit 224 for the user being authenticated to the mobile terminal 23 possessed by the user. The transmission/reception unit 221 and the key code transmission unit 226 may have a single configuration.

Figure 21:
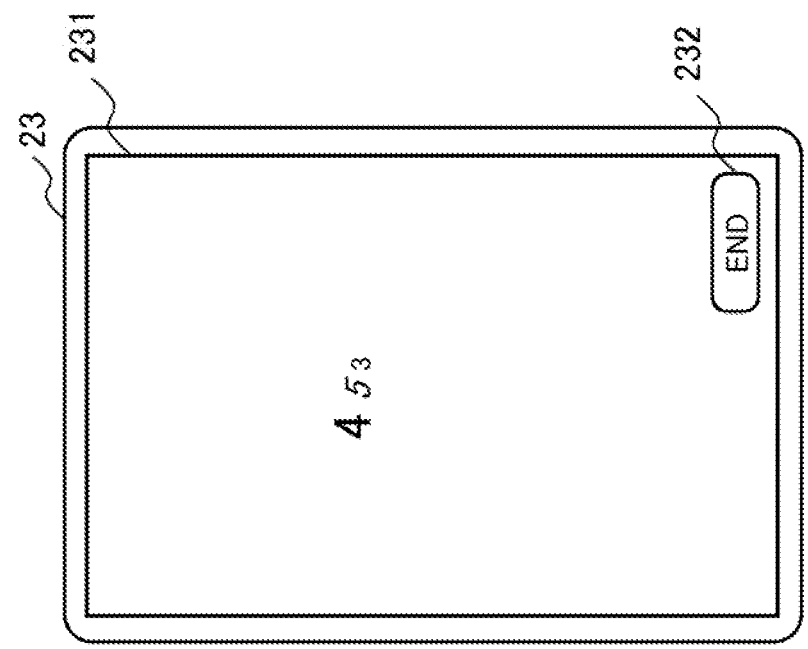
FIG. 21 is a conceptual diagram illustrating an example in which a key code received from the authentication device of the authentication system of the second example embodiment is displayed on a screen of a mobile terminal.

FIG. 21 is a conceptual diagram illustrating an example in which a key code is displayed on the screen 231 of the mobile terminal 23. When receiving a key code used for authentication by the user who possesses the mobile terminal 23 from the authentication device, the mobile terminal displays the key code on a screen 231 of the mobile terminal. The example of FIG. 21 illustrates a state in which the key code "453" is displayed on the screen 231 of the mobile terminal 23 in different display states. FIG. 21 illustrates an example in which an end button 232 for deleting the display of the key code is displayed on the screen 231 displaying the key code. For example, when the user carrying the mobile terminal 23 confirms the key code displayed on the screen 231 of the mobile terminal 23, the user presses the end button 232. The key code displayed on the screen 231 of the mobile terminal 23 disappears from the screen 231 when the end button 232 is pressed. In order to improve security, the key code displayed on the screen 231 of the mobile terminal 23 may be deleted from the mobile terminal 23 at the timing when the end button 232 is pressed. In a case where the key code is deleted due to a malfunction by the user, authentication using the input terminal 21 is performed again, and the key code may be generated again based on a new random number sequence pattern. In order to improve security, the key code displayed on the screen 231 of the mobile terminal 23 may be deleted at a timing when a predetermined time has elapsed.

(Operation)

Next, an operation of the authentication system 2 of the present example embodiment will be described with reference to the drawings. Hereinafter, an example in which the input terminal 21, the authentication device 22, and the mobile terminal 23 constituting the authentication system 2 are set as operation subjects will be described.

[Input Terminal]

Figure 22:
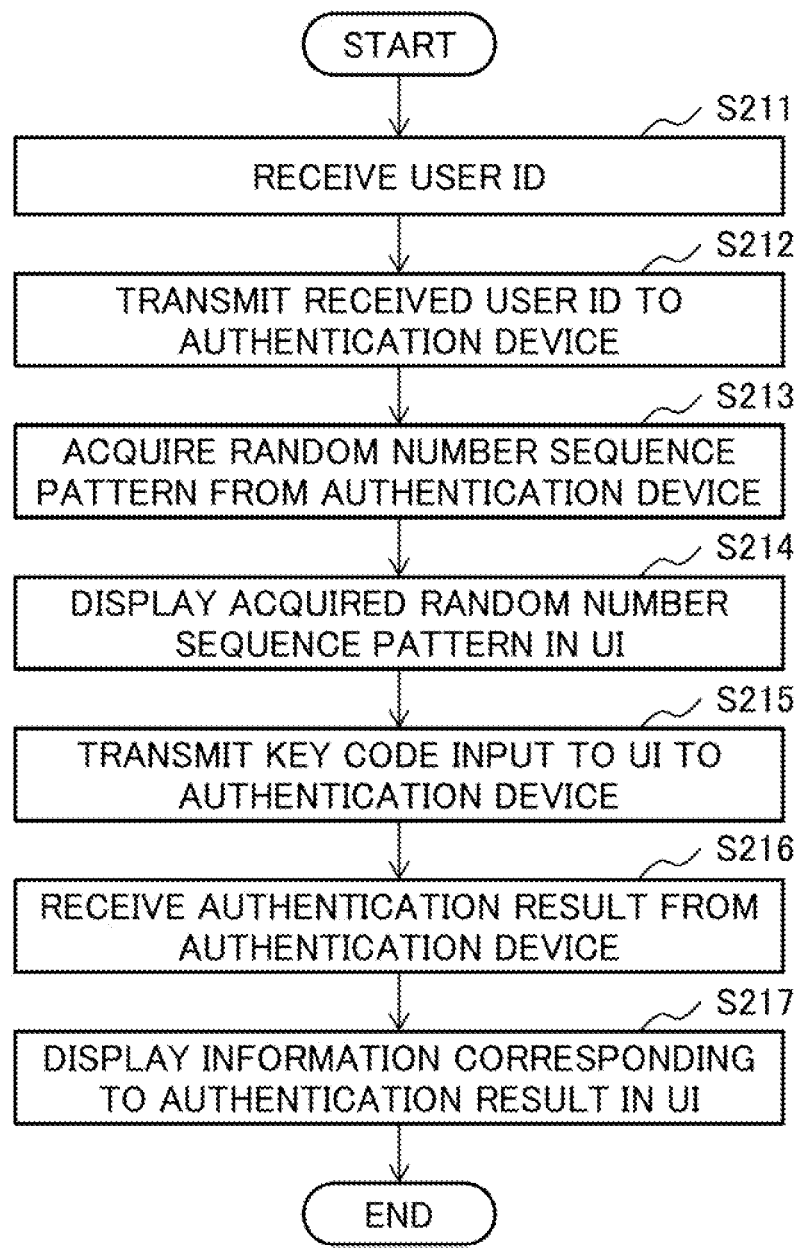
FIG. 22 is a flowchart for describing an example of an operation of an input terminal of the authentication system according to the second example embodiment.

FIG. 22 is a flowchart for describing the operation of the input terminal 21. In the description along the flowchart of FIG. 22, the input terminal 21 will be described as an operation subject. The processing of the input terminal 21 along the flowchart of FIG. 22 is similar to the processing of the input terminal 11 along the flowchart of FIG. 17.

In FIG. 22, first, the input terminal 21 receives the user ID of the user to be authenticated (step S211). For example, the input terminal 21 detects, as the start of the authentication operation, insertion of an authentication card into the input terminal 21 or input of ID information on an authentication dedicated page or the like on the web.

Next, the input terminal 21 transmits the received user ID to the authentication device 22 (step S212).

Next, the input terminal 21 acquires the random number sequence pattern transmitted according to the user ID transmitted from the input terminal itself from the authentication device 22 (step S213).

Next, the input terminal 21 displays the acquired random number sequence pattern on the UI of the input terminal itself (step S214). A key code consisting of a numeral selected based on the shared rule by the user to be authenticated is input to the input terminal 21.

Next, the input terminal 21 transmits the key code input by the user to the authentication device 22 (step S215).

Next, the input terminal 21 receives an authentication result from the authentication device 22 (step S216).

Next, the input terminal 21 displays information corresponding to the authentication result on the UI of the own device (step S217). For example, in a case where authentication is performed by the authentication device 22, a service corresponding to the authentication result is provided to the user to be authenticated.

[Face Authentication Device]

Figure 23:
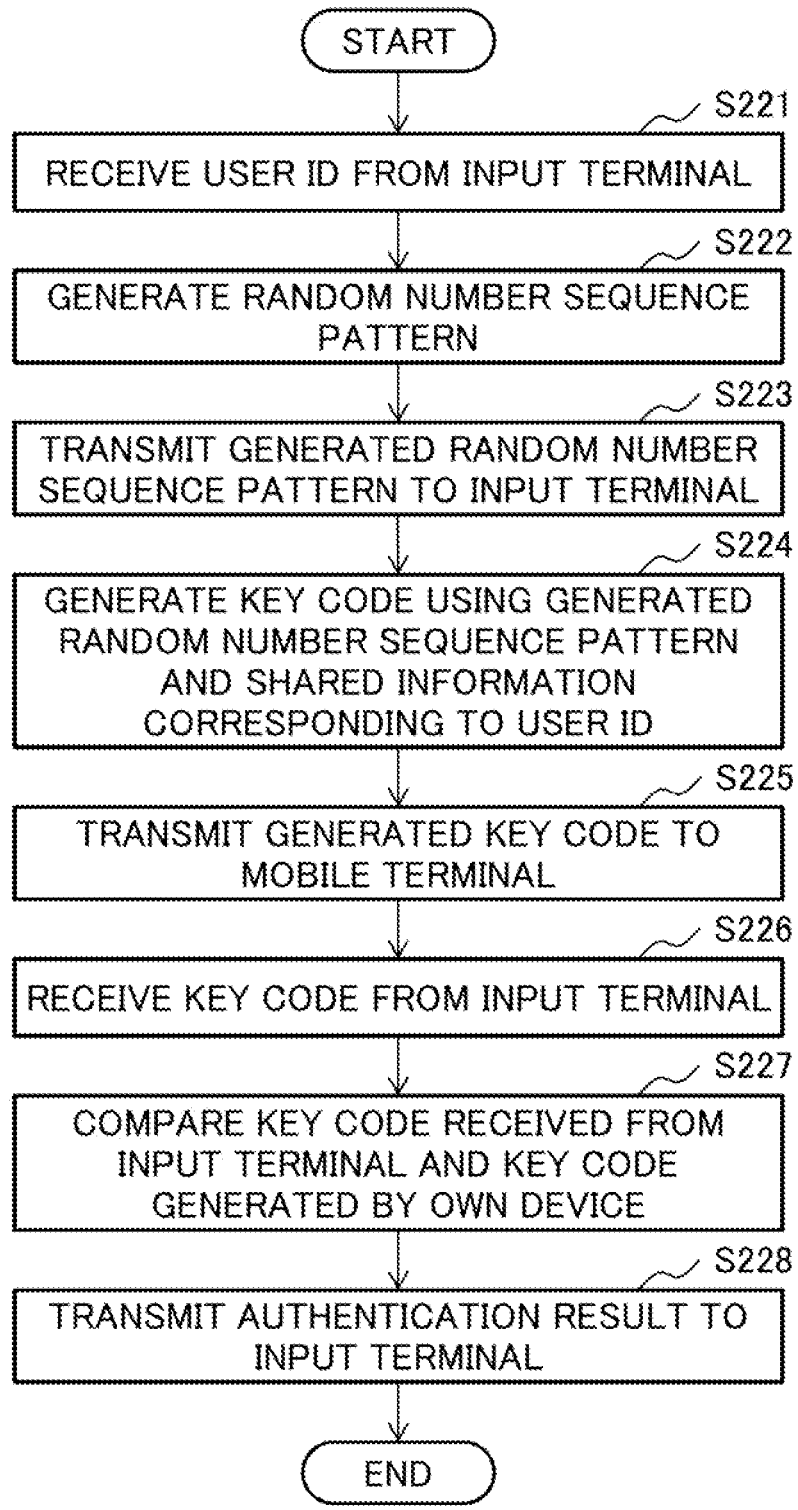
FIG. 23 is a flowchart for describing an example of an operation of the authentication device of the authentication system of the second example embodiment.

FIG. 23 is a flowchart for describing the operation of the authentication device 22. In the description along the flowchart of FIG. 23, the authentication device 22 will be described as an operation subject.

In FIG. 23, first, the authentication device 22 receives the user ID of the user to be authenticated from the input terminal 21 (step S221).

Next, the authentication device 22 generates a random number sequence pattern in association with the user ID (step S222).

Next, the authentication device 22 transmits the generated random number sequence pattern to the input terminal 21 (step S223).

Next, the authentication device 22 generates a key code using the generated random number sequence pattern and the shared information associated to the user ID (step S224).

Next, the authentication device 22 transmits the generated key code to the mobile terminal 23 (step S225).

Next, the authentication device 22 receives the key code from the input terminal 21 (step S226).

Next, the authentication device 22 compares the key code received from the input terminal 21 with the key code generated by the authentication device itself (step S227). When the key code received from the input terminal 21 matches the key code generated by the authentication device 22, the authentication device generates an authentication result indicating that the user being authenticated is authenticated. When the key code received from the input terminal 21 does not match the key code generated by the authentication device 22, the authentication device generates an authentication result indicating that the user being authenticated is not authenticated.

Next, the authentication device 22 transmits an authentication result to the input terminal 21 (step S228). For example, a system that provides a service to an authenticated user provides a predetermined service to a user authenticated by the authentication device 22.

[Mobile Terminal]

Figure 24:
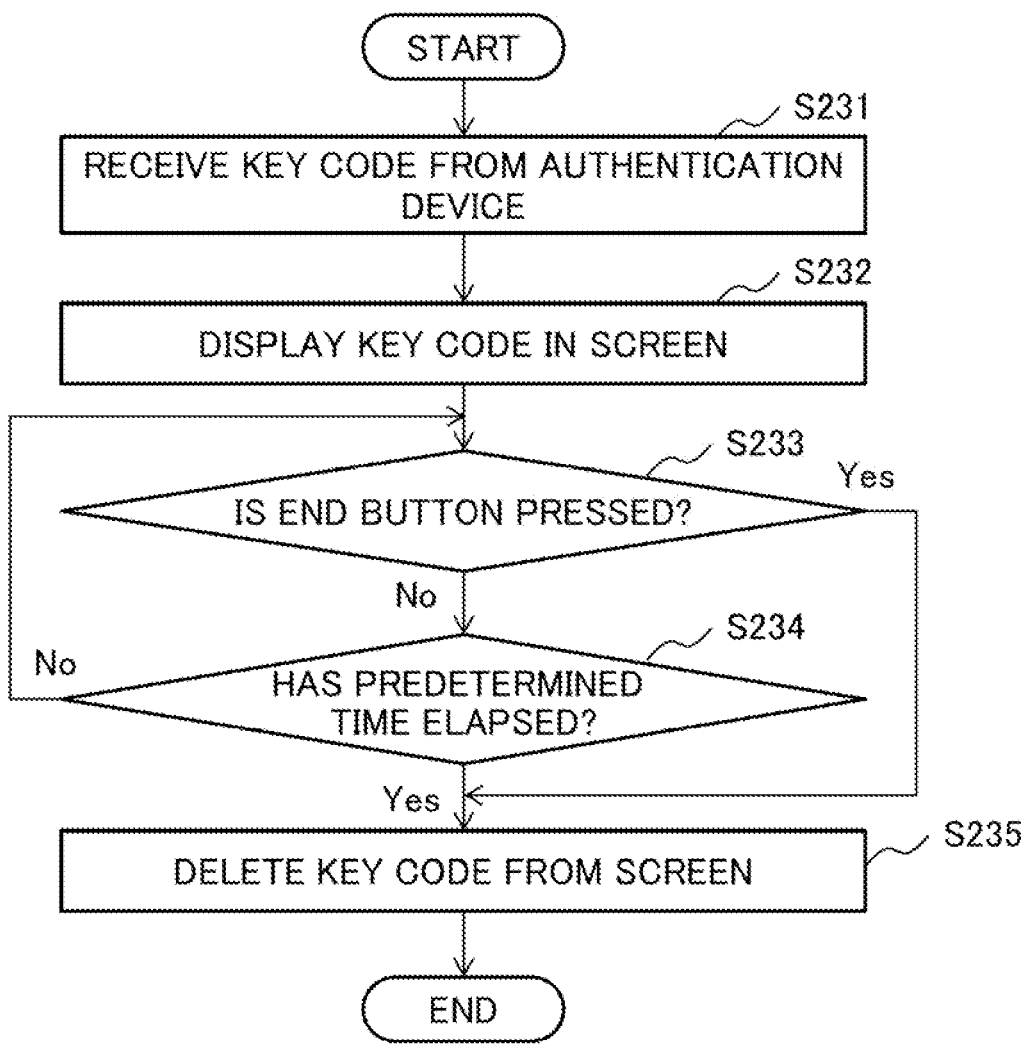
FIG. 24 is a flowchart for describing an example of an operation of the mobile terminal of the authentication system of the second example embodiment.

FIG. 24 is a flowchart for describing the operation of the mobile terminal 23. In the description along the flowchart of FIG. 24, the mobile terminal 23 will be described as an operation subject.

In FIG. 24, first, the mobile terminal 23 receives, from the authentication device 22, a key code used for authentication by the user who possesses the mobile terminal itself (step S231).

Next, the mobile terminal 23 displays the received key code on the screen of its own device (step S232).

When the end button displayed on the screen of the mobile terminal 23 is pressed (Yes in step S233), the mobile terminal 235 deletes the key code from the screen (step S235).

Even if the end button displayed on the screen of the mobile terminal 23 is not pressed (No in step S233), when the predetermined time has elapsed (Yes in step S234), the mobile terminal deletes the key code from the screen (step S235). When the predetermined time has not elapsed (No in step S234), the mobile terminal 23 waits for pressing of the end button or elapse of the predetermined time.

As described above, the authentication system of the present example embodiment includes the input terminal, the authentication device, and the mobile terminal. The input terminal and the authentication device are communicably connected. The mobile terminal is carried by the user to be authenticated and is communicably connected to the authentication device. The input terminal receives identification information of the user to be authenticated, and transmits the received identification information to the authentication device. The authentication device stores shared information including a password and a shared rule preset for each user. The authentication device receives the identification information of the user to be authenticated from the input terminal operated by the user to be authenticated. The authentication device generates a random number sequence pattern including a plurality of different numerals in response to reception of the identification information of the user to be authenticated. The authentication device transmits the generated random number sequence pattern to the input terminal in association with the identification information. The authentication device selects a plurality of provisional numerals from the random number sequence pattern based on the shared rule. The authentication device generates the key code using the plurality of selected provisional numerals and the plurality of secret numerals constituting the password. The authentication device transmits the generated key code to the mobile terminal used by the user to be authenticated. The input terminal receives the random number sequence pattern generated by the authentication device in association with the identification information from the authentication device. The input terminal displays the random number sequence pattern on the user interface of the input terminal itself. The mobile terminal displays the key code received from the authentication device on a screen of the mobile terminal. The input terminal transmits the key code input via the user interface to the authentication device by the user who has confirmed the key code of the mobile terminal. The authentication device receives, from the input terminal, the key code consisting of the numeral selected by the user to be authenticated from the random number sequence pattern based on the shared rule. The authentication device authenticates the user to be authenticated based on the key code received from the input terminal and the key code generated by the authentication device itself.

According to the present example embodiment, even in a situation where the user to be authenticated cannot recall the shared rule, the authentication is performed via the key code generated by the calculation method that cannot be specified from the outside, so that it is possible to prevent leakage of the authentication information.

Third Example Embodiment

Next, an authentication device according to a third example embodiment will be described with reference to the drawings. The authentication device of the present example embodiment has a configuration in which the authentication devices of the first and second example embodiments are simplified.

Figure 25:
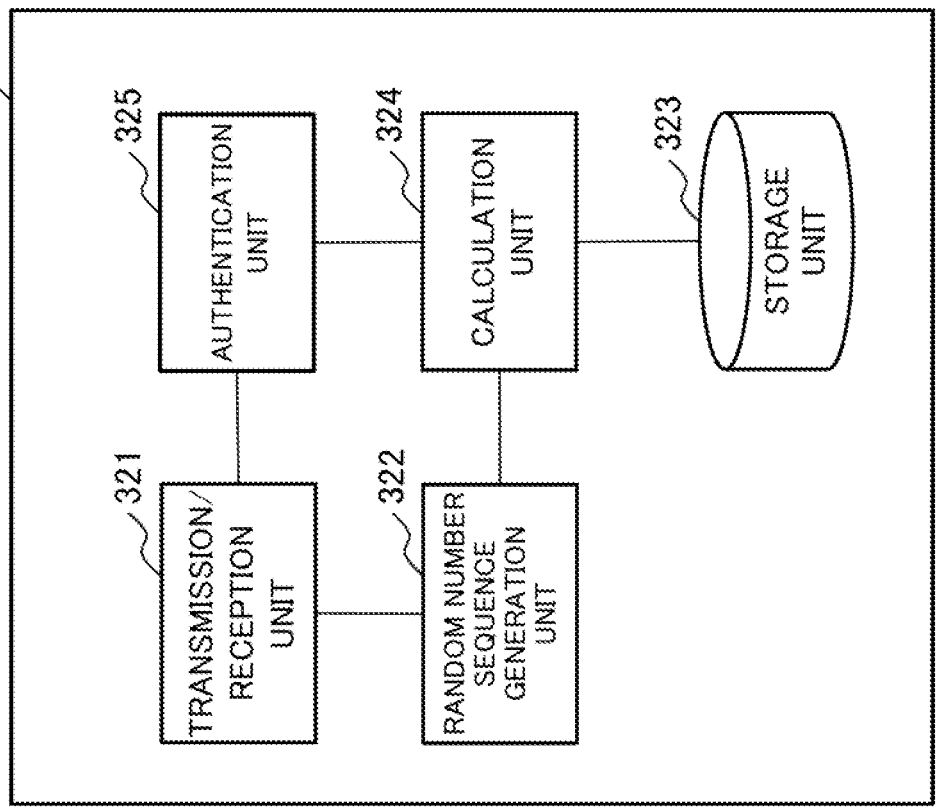
FIG. 25 is a block diagram illustrating an example of a configuration of an authentication system of a third example embodiment.

FIG. 25 is a block diagram illustrating an example of a configuration of an authentication device 32 according to the present example embodiment. The authentication device 32 includes a transmission/reception unit 321, a random number sequence generation unit 322, a storage unit 323, a calculation unit 324, and an authentication unit 325.

In the authentication opportunity of the user to be authenticated, the transmission/reception unit 321 receives the identification information of the user to be authenticated from the input terminal operated by the user to be authenticated. The transmission/reception unit 321 transmits the random number sequence pattern generated at the authentication opportunity of the user to be authenticated to the input terminal in association with the identification information. The transmission/reception unit 321 receives, from the input terminal, the key code consisting of the numeral selected by the user to be authenticated from the random number sequence pattern based on the shared rule.

The random number sequence generation unit 322 generates a random number sequence pattern including a plurality of different numerals for each authentication opportunity of the user to be authenticated.

The storage unit 323 stores shared information including a password and a shared rule preset for each user.

The calculation unit 324 selects a plurality of provisional numerals from the random number sequence pattern based on the shared rule. The calculation unit 324 generates the key code using the plurality of selected provisional numerals and the plurality of secret numerals constituting the password.

The authentication unit 325 authenticates the user to be authenticated based on the key code received from the input terminal and the key code generated by the calculation unit.

According to the authentication device of the present example embodiment, authentication is performed using the key code calculated using the random number sequence pattern temporarily generated by the authentication device based on the shared information shared between the user and the authentication device, so that leakage of the authentication information can be prevented.

(Hardware)

Here, a hardware configuration for executing processing by a device such as an input terminal, an authentication terminal, or a mobile terminal according to each example embodiment will be described using the information processing device 90 of FIG. 26 as an example. The information processing device 90 in FIG. 26 is a configuration example for executing processing of the device of each example embodiment, and does not limit the scope of the present disclosure.

Figure 26:
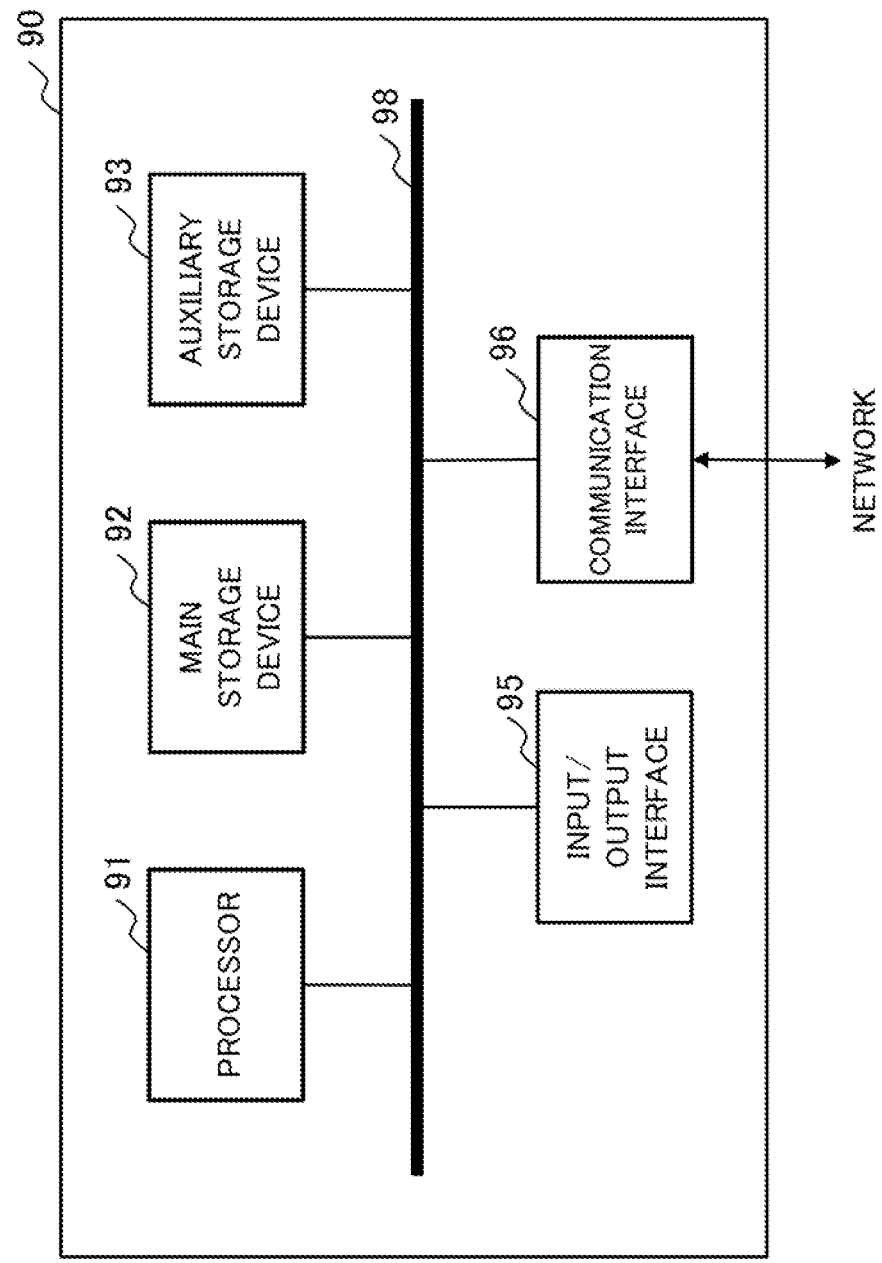
FIG. 26 is a block diagram illustrating an example of a hardware configuration of a device constituting the authentication system according to each example embodiment.

As illustrated in FIG. 26, the information processing device 90 includes a processor 91, a main storage device 92, an auxiliary storage device 93, an input/output interface 95, and a communication interface 96. In FIG. 26, the interface is abbreviated as an I/F. The processor 91, the main storage device 92, the auxiliary storage device 93, the input/output interface 95, and the communication interface 96 are data-communicably connected to each other via a bus 98. The processor 91, the main storage device 92, the auxiliary storage device 93, and the input/output interface 95 are connected to a network such as the Internet or an intranet via the communication interface 96.

The processor 91 develops a program stored in the auxiliary storage device 93 or the like in the main storage device 92 and executes the developed program. In the present example embodiment, a software program installed in the information processing device 90 may be used. The processor 91 executes processing by the device according to each example embodiment.

The main storage device 92 has an area in which a program is developed. The main storage device 92 may be a volatile memory such as a dynamic random access memory (DRAM). A nonvolatile memory such as a magnetoresistive random access memory (MRAM) may be configured and added as the main storage device 92.

The auxiliary storage device 93 stores various data. The auxiliary storage device 93 includes a local disk such as a hard disk or a flash memory. Various data may be stored in the main storage device 92, and the auxiliary storage device 93 may be omitted.

The input/output interface 95 is an interface for connecting the information processing device 90 and a peripheral device. The communication interface 96 is an interface for connecting to an external system or device through a network such as the Internet or an intranet based on a standard or a specification. The input/output interface 95 and the communication interface 96 may be shared as an interface connected to an external device.

An input device such as a keyboard, a mouse, or a touch panel may be connected to the information processing device 90 as necessary. These input devices are used to input information and settings. When the touch panel is used as an input device, the display screen of the display device may also serve as the interface of the input device. Data communication between the processor 91 and the input device may be mediated by the input/output interface 95.

The information processing device 90 may be provided with a display device for displaying information. In a case where a display device is provided, the information processing device 90 may include a display control device (not illustrated) for controlling display of the display device. The display device may be connected to the information processing device 90 via the input/output interface 95.

The above is an example of the hardware configuration for enabling the device according to each example embodiment. The hardware configuration of FIG. 26 is an example of a hardware configuration for executing arithmetic processing of the device according to each example embodiment, and does not limit the scope of the present disclosure. A program for causing a computer to execute processing regarding the device according to each example embodiment is also included in the scope of the present disclosure. Further, a recording medium in which the program according to each example embodiment is recorded is also included in the scope of the present disclosure. The recording medium can be achieved by, for example, an optical recording medium such as a compact disc (CD) or a digital versatile disc (DVD). The recording medium may be achieved by a semiconductor recording medium such as a universal serial bus (USB) memory or a secure digital (SD) card, a magnetic recording medium such as a flexible disk, or another recording medium.

The components of the device in each example embodiment can be arbitrarily combined. The components of the device of each example embodiment may be implemented by software or may be implemented by a circuit.

Although the present disclosure has been described with reference to the embodiments, the present disclosure is not limited to the above embodiments. Various modifications that can be understood by those skilled in the art can be made to the configuration and details of the present disclosure within the scope of the present disclosure.

This application is based upon and claims the benefit of priority from Japanese patent application No. 2020-153425, filed on Sep. 14, 2020, the disclosure of which is incorporated herein in its entirety by reference.

REFERENCE SIGNS LIST 1, 2 authentication system
11, 21 input terminal
12, 22, 32 authentication device
23 mobile terminal
111 UI
112 display control unit
113 transmission/reception unit
121, 221, 321 transmission/reception unit
122, 222, 322 random number sequence generation unit
123, 223, 323 storage unit
124, 224, 324 calculation unit
125, 225, 325 authentication unit
226 key code transmission unit

What is claimed is:

1. An authentication device comprising:
a memory;
at least one processor coupled to the memory; and
a storage unit storing shared information including a password and a shared rule, the password and the shared rule being preset for each user, the shared rule including a shared pattern and a calculation rule that are preset by the user, the shared pattern being a pattern indicating an order of selecting a provisional numeral from a random number sequence pattern in which a plurality of different numerals are arranged in a matrix, the calculation rule being a rule related to calculation using the provisional numeral selected from the random number sequence pattern and a secret numeral constituting the password,
the at least one processor performing operations to:
generate the random number sequence pattern including a plurality of different numerals for each authentication opportunity of a user to be authenticated;
select a plurality of provisional numerals from the random number sequence pattern based on the shared rule, and generate a key code using the plurality of selected provisional numerals and a plurality of secret numerals constituting the password;
receive, in an authentication opportunity of the user to be authenticated, identification information of the user to be authenticated from an input terminal operated by the user to be authenticated, transmit the random number sequence pattern generated in the authentication opportunity of the user to be authenticated to the input terminal in association with the identification information, and receive, from the input terminal, the key code consisting of a numeral selected by the user to be authenticated from the random number sequence pattern based on the shared rule; and
authenticate the user to be authenticated based on the key code received from the input terminal and the key code generated, wherein
the storage unit stores the shared pattern including a center numeral as a reference and a pattern for selecting the provisional numeral around the center numeral from the random number sequence pattern based on the center numeral.

2. The authentication device according to claim 1, wherein
the storage unit stores the calculation rule including a rule that stores, when a numerical value, calculated by calculation using the provisional numeral selected from the random number sequence pattern and the secret numeral constituting the password, is not included in the plurality of numerals constituting the random number sequence pattern, a predetermined calculation performed on the calculated numerical value.

3. The authentication device according to claim 1, wherein
the storage unit stores the shared pattern changed every predetermined period based on a rule shared with the user.

4. The authentication device according to claim 1, wherein
the storage unit stores the password changed every predetermined period based on a rule shared with the user.

5. The authentication device according to claim 1, wherein the at least one processor further performs operation to:
transmit the key code generated by the calculation unit to a mobile terminal used by the user to be authenticated.

6. The authentication device according to claim 1, wherein
the storage unit stores the shared pattern including a first center numeral, a second center numeral and a pattern for selecting the provisional numeral around the first center numeral from the random number sequence pattern and selecting the provisional numeral around the second center numeral from the random number sequence pattern if the first center numeral is not included in the random number sequence pattern.

7. An authentication method comprising:
storing, in a storage unit, shared information including a password and a shared rule, the password and the shared rule being preset for each user, the shared rule including a shared pattern and a calculation rule that are preset by the user, the shared pattern being a pattern indicating an order of selecting a provisional numeral from a random number sequence pattern in which a plurality of different numerals are arranged in a matrix, the calculation rule being a rule related to calculation using the provisional numeral selected from the random number sequence pattern and a secret numeral constituting the password;
receiving identification information of a user to be authenticated from an input terminal operated by the user to be authenticated;
generating the random number sequence pattern including a plurality of different numerals in response to reception of identification information of the user to be authenticated;
transmitting the generated random number sequence pattern to the input terminal in association with the identification information;
selecting a plurality of provisional numerals from the random number sequence pattern based on the shared rule;
generating a key code using the plurality of selected provisional numerals and a plurality of secret numerals constituting the password;
receiving, from the input terminal, the key code consisting of a numeral selected by the user to be authenticated from the random number sequence pattern based on the shared rule; and
authenticating the user to be authenticated based on the key code received from the input terminal and the key code generated by an own device, wherein
the storage unit stores the shared pattern including a center numeral as a reference and a pattern for selecting the provisional numeral around the center numeral from the random number sequence pattern based on the center numeral.

8. A non-transitory recording medium recording a program, when executed by a computer, causing the computer to perform:
storing, in a storage unit, shared information including a password and a shared rule, the password and the shared rule being preset for each user, the shared rule including a shared pattern and a calculation rule that are preset by the user, the shared pattern being a pattern indicating an order of selecting a provisional numeral from a random number sequence pattern in which a plurality of different numerals are arranged in a matrix, the calculation rule being a rule related to calculation using the provisional numeral selected from the random number sequence pattern and a secret numeral constituting the password;

receiving identification information of a user to be authenticated from an input terminal operated by the user to be authenticated;

generating the random number sequence pattern including a plurality of different numerals in response to reception of identification information of the user to be authenticated;

transmitting the generated random number sequence pattern to the input terminal in association with the identification information;

selecting a plurality of provisional numerals from the random number sequence pattern based on the shared rule;

generating a key code using the plurality of selected provisional numerals and a plurality of secret numerals constituting the password;

receiving, from the input terminal, the key code consisting of a numeral selected by the user to be authenticated from the random number sequence pattern based on the shared rule; and authenticating the user to be authenticated based on the key code received from the input terminal and the key code generated by an own device, wherein the storage unit stores the shared pattern including a center numeral as a reference and a pattern for selecting the provisional numeral around the center numeral from the random number sequence pattern based on the center numeral.

* * * * *